US010802237B2

(12) United States Patent
Bakatsias et al.

(10) Patent No.: US 10,802,237 B2
(45) Date of Patent: Oct. 13, 2020

(54) FIBER OPTIC CABLE MANAGEMENT SYSTEM

(71) Applicant: RAYCAP S.A., Athens (GR)

(72) Inventors: Kostantinos Bakatsias, Athens (GR); Charis Coletti, Athens (GR); Andreas Vagenas, Athens (GR); Cynthia Steele, Spokane Valley, WA (US); Jonathan Martinez, Spokane Valley, WA (US)

(73) Assignee: RAYCAP S.A., Athens (GR)

( * ) Notice: Subject to any disclaimer, the term of this patent is extended or adjusted under 35 U.S.C. 154(b) by 0 days.

(21) Appl. No.: 15/836,021

(22) Filed: Dec. 8, 2017

(65) Prior Publication Data

US 2018/0157000 A1 Jun. 7, 2018

Related U.S. Application Data

(63) Continuation-in-part of application No. 14/931,699, filed on Nov. 3, 2015, now Pat. No. 9,971,119.

(51) Int. Cl.
*G02B 6/44* (2006.01)
*G02B 6/38* (2006.01)
*G02B 6/42* (2006.01)

(52) U.S. Cl.
CPC ......... *G02B 6/4455* (2013.01); *G02B 6/4457* (2013.01); *G02B 6/4471* (2013.01);
(Continued)

(58) Field of Classification Search
USPC ................................................ 385/100, 135
See application file for complete search history.

(56) References Cited

U.S. PATENT DOCUMENTS 3,066,181 A 11/1962 Archibald
3,165,372 A 1/1965 Jacobs
(Continued)

FOREIGN PATENT DOCUMENTS

DE 20 2005 021740 U1 8/2009
DE CH698717 B1 10/2009
(Continued)

OTHER PUBLICATIONS

"Relay" from Wikipedia. Downloaded Oct. 30, 2009.
(Continued)

*Primary Examiner* — Eric Wong
(74) *Attorney, Agent, or Firm* — Schwabe, Williamson & Wyatt, PC

(57) ABSTRACT

A fiber optic cable management system includes a tray configured to reciprocate inside of an enclosure between an inserted position and an extended position. Optical fiber modules are located in the tray and retain optical fiber splitters or optical fiber multiplexer/de-multiplexers. The tray when moved to the extended position moves the optical fiber modules out of the front end of the rack enclosure. This allows a technician to access the back of the modules for maintenance operations without having to access the back end of the enclosure. A flexible cable guide allows the optical fibers connected to the modules to move with the tray into and out of the enclosure. Reflectors can be attached to the connectors to test fiber optic lines between a central office and the cell site location.

19 Claims, 23 Drawing Sheets

(52) U.S. Cl.
CPC .......... *G02B 6/3897* (2013.01); *G02B 6/4286* (2013.01); *G02B 6/4448* (2013.01); *G02B 6/4452* (2013.01)

(56) References Cited

U.S. PATENT DOCUMENTS

| | | |
|---|---|---|
| 3,247,479 A | 4/1966 | Knipping |
| 3,659,189 A | 4/1972 | Kiviranna |
| 3,876,076 A | 4/1975 | Hazelhurst |
| 3,976,351 A | 8/1976 | Hopfe |
| 4,030,061 A | 6/1977 | Gaskell |
| 4,236,190 A | 11/1980 | Hollingsead |
| 4,918,565 A | 4/1990 | King |
| 4,976,508 A | 12/1990 | Okura |
| 5,030,128 A | 7/1991 | Herron |
| 5,311,397 A | 5/1994 | Harshberger |
| 5,339,379 A * | 8/1994 | Kutsch ................. G02B 6/4452 385/135 |
| D361,314 S | 8/1995 | Ryan |
| D362,232 S | 9/1995 | Ryan |
| 5,473,718 A | 12/1995 | Sommer |
| 5,491,766 A | 2/1996 | Huynh |
| 5,530,215 A | 6/1996 | Couvreur |
| 5,555,153 A | 9/1996 | Frederiksen |
| 5,602,532 A | 2/1997 | Ryan |
| 5,627,721 A | 5/1997 | Figueiredo |
| 5,651,698 A | 7/1997 | Locati |
| 5,701,227 A | 12/1997 | Ryan |
| 5,717,685 A | 2/1998 | Abraham |
| 5,790,360 A | 8/1998 | Ryan |
| 5,805,757 A | 9/1998 | Bloom |
| 5,903,693 A | 5/1999 | Brown |
| 5,914,845 A | 6/1999 | Chase |
| 5,953,193 A | 9/1999 | Ryan |
| 5,966,282 A | 10/1999 | Ryan |
| 5,969,932 A | 10/1999 | Ryan |
| 6,031,706 A | 2/2000 | Nabell |
| 6,037,544 A | 3/2000 | Lee |
| 6,038,119 A | 3/2000 | Atkins |
| 6,074,247 A | 6/2000 | Hall |
| 6,114,632 A | 9/2000 | Planas, Sr. |
| 6,122,156 A | 9/2000 | Nabell |
| 6,125,048 A | 9/2000 | Loughran |
| 6,389,214 B1 | 5/2002 | Smith |
| 6,418,262 B1 | 7/2002 | Puetz et al. |
| 6,430,020 B1 | 8/2002 | Atkins |
| 6,535,369 B1 | 3/2003 | Redding |
| 6,556,402 B2 | 4/2003 | Kizis |
| 6,623,315 B1 | 9/2003 | Roderick |
| 6,640,111 B1 | 10/2003 | Shapira |
| 6,654,223 B1 | 11/2003 | Bippus |
| 6,715,619 B2 | 4/2004 | Kim et al. |
| 6,719,615 B1 | 4/2004 | Molnar |
| 6,729,902 B2 | 5/2004 | Martich |
| 6,738,555 B1 | 5/2004 | Cooke |
| 6,748,155 B2 | 6/2004 | Kim et al. |
| 6,763,171 B2 | 7/2004 | D'Inca |
| 6,771,861 B2 | 8/2004 | Wagner |
| 6,792,190 B2 | 9/2004 | Xin et al. |
| 6,804,447 B2 | 10/2004 | Smith |
| 6,809,258 B1 | 10/2004 | Dang et al. |
| 6,813,510 B1 | 11/2004 | Kunzinger |
| 6,851,966 B1 | 2/2005 | Tomasino |
| 6,876,533 B1 | 4/2005 | Ryan |
| 6,937,807 B2 | 8/2005 | Franklin et al. |
| 7,008,256 B2 | 3/2006 | Poiraud |
| 7,035,073 B2 | 4/2006 | Bennett |
| 7,218,828 B2 | 5/2007 | Feustel et al. |
| 7,228,047 B1 | 6/2007 | Szilagyi |
| 7,302,149 B2 | 11/2007 | Swam et al. |
| 7,327,926 B2 | 2/2008 | Barth |
| 7,376,322 B2 | 5/2008 | Zimmel |
| 7,397,673 B1 | 7/2008 | Wilson |
| 7,433,169 B2 | 10/2008 | Kamel |
| 7,460,381 B2 | 12/2008 | Lanni |
| 7,508,687 B2 | 3/2009 | Manolescu |
| 7,526,174 B2 | 4/2009 | Leon et al. |
| 7,664,363 B1 | 2/2010 | Mowery, Sr. |
| 7,739,522 B2 | 6/2010 | Festo |
| 7,768,794 B1 | 8/2010 | Wilson |
| RE41,655 E | 9/2010 | Woodhead |
| 7,873,252 B2 * | 1/2011 | Smrha ................. G02B 6/4446 385/135 |
| 7,894,782 B2 | 2/2011 | Rofougaran |
| 7,946,863 B2 | 5/2011 | Loch |
| 7,949,315 B2 | 5/2011 | Rofougaran |
| 7,972,067 B2 | 7/2011 | Haley |
| 8,021,189 B2 | 9/2011 | Zayas |
| 8,111,966 B2 | 2/2012 | Holmberg |
| 8,121,457 B2 * | 2/2012 | Zimmel ................. G02B 6/3825 385/135 |
| 8,180,192 B2 | 5/2012 | Zimmel |
| 8,279,067 B2 | 10/2012 | Berger |
| 8,383,521 B2 | 2/2013 | Nishimura et al. |
| 8,401,497 B2 | 3/2013 | Rofougaran |
| 8,401,501 B2 | 3/2013 | Rofougaran |
| 8,412,385 B2 | 4/2013 | Brumett, Jr. |
| 8,457,461 B2 | 6/2013 | Ott |
| 8,467,655 B2 | 6/2013 | German |
| 8,490,799 B2 | 7/2013 | Knight |
| 8,521,100 B2 | 8/2013 | Rofougaran |
| 8,620,549 B2 | 8/2013 | Rofougaran |
| 8,526,200 B2 | 9/2013 | Miller |
| 8,526,893 B2 | 9/2013 | Rofougaran |
| 8,547,164 B2 | 10/2013 | Flores |
| 8,566,627 B2 | 10/2013 | Halepete |
| 8,577,359 B2 | 11/2013 | Wesby |
| 8,588,606 B2 | 11/2013 | Watte |
| 8,600,318 B2 | 12/2013 | Rofougaran |
| 8,730,639 B1 | 5/2014 | Wilson |
| 8,754,622 B2 | 6/2014 | Dobkin |
| 8,780,519 B2 | 7/2014 | Miller |
| 8,810,990 B1 | 8/2014 | Miller |
| 8,831,395 B2 | 9/2014 | Sievers |
| 8,839,594 B2 | 9/2014 | Smith |
| 8,873,926 B2 | 10/2014 | Beamon |
| 8,938,143 B2 | 1/2015 | Do |
| 8,989,548 B2 | 3/2015 | Kopf |
| 8,995,106 B2 | 3/2015 | Miller |
| 9,049,500 B2 | 6/2015 | Conner et al. |
| 9,057,862 B2 | 6/2015 | Strasser |
| 9,099,860 B2 | 8/2015 | Martinez |
| 9,140,872 B2 | 9/2015 | Sedor |
| 9,179,500 B2 | 11/2015 | Yu |
| 9,281,866 B2 | 3/2016 | Smentek |
| 9,448,576 B2 | 9/2016 | Chamberlain |
| 9,575,277 B2 | 2/2017 | Bakatsias |
| 9,640,986 B2 | 5/2017 | Politis |
| 9,673,904 B2 | 6/2017 | Palanisamy |
| 10,429,604 B2 | 10/2019 | Bakatsias |
| 2001/0053971 A1 | 12/2001 | Demetrescu |
| 2002/0055306 A1 | 5/2002 | Jenks |
| 2002/0150372 A1 * | 10/2002 | Schray ................. G02B 6/3897 385/135 |
| 2002/0196593 A1 | 12/2002 | Kizis |
| 2003/0027521 A1 | 2/2003 | Yip |
| 2003/0085621 A1 | 5/2003 | Potega |
| 2003/0113086 A1 | 6/2003 | Jun et al. |
| 2003/0148668 A1 | 8/2003 | Lias |
| 2004/0119386 A1 | 6/2004 | Guidez |
| 2004/0198451 A1 | 10/2004 | Varghese |
| 2004/0246693 A1 | 12/2004 | Lloyd |
| 2005/0036262 A1 | 2/2005 | Siebenthall |
| 2005/0042920 A1 | 2/2005 | Poiraud |
| 2005/0094359 A1 | 5/2005 | Lee |
| 2005/0157461 A1 | 7/2005 | Cauthron |
| 2006/0139836 A1 | 6/2006 | Anthony |
| 2006/0153362 A1 | 7/2006 | Bloodworth |
| 2007/0024372 A1 | 2/2007 | Hagen |
| 2007/0093204 A1 | 4/2007 | Kincade |
| 2007/0163801 A1 | 7/2007 | Coffey |
| 2007/0217101 A1 | 9/2007 | Carter |
| 2008/0037188 A1 | 2/2008 | Wilson |
| 2008/0106881 A1 | 5/2008 | Tari |

(56) References Cited

U.S. PATENT DOCUMENTS

| | | |
|---|---|---|
| 2008/0117555 A1 | 5/2008 | Wilson |
| 2008/0139045 A1 | 6/2008 | Ho |
| 2008/0186667 A1 | 8/2008 | Verdelli |
| 2008/0247112 A1 | 10/2008 | Benedetto |
| 2008/0272654 A1 | 11/2008 | Lontka |
| 2008/0278889 A1 | 11/2008 | Briggs |
| 2008/0298762 A1 | 12/2008 | Hawley |
| 2008/0310060 A1 | 12/2008 | Metral |
| 2009/0103218 A1 | 4/2009 | Ryan |
| 2009/0103881 A1 | 4/2009 | Gonzalez |
| 2009/0226143 A1 | 9/2009 | Beck |
| 2009/0238531 A1 | 9/2009 | Holmberg |
| 2009/0257727 A1 | 10/2009 | Laurisch et al. |
| 2010/0034507 A1 | 2/2010 | Sielaff |
| 2010/0054676 A1 | 3/2010 | Cooke |
| 2010/0181840 A1 | 7/2010 | Coulson |
| 2010/0259871 A1 | 10/2010 | Ewing |
| 2011/0101937 A1 | 5/2011 | Dobkin |
| 2011/0135316 A1 | 6/2011 | Fankhauser |
| 2011/0237299 A1 | 9/2011 | Boss |
| 2012/0043432 A1 | 2/2012 | Heitmeyer |
| 2012/0051710 A1 | 3/2012 | Zeng |
| 2012/0069882 A1 | 3/2012 | Nino |
| 2012/0092835 A1 | 4/2012 | Miller |
| 2012/0114295 A1 | 5/2012 | Guzzo et al. |
| 2012/0200978 A1 | 8/2012 | Miller |
| 2012/0200979 A1 | 8/2012 | Miller |
| 2012/0230636 A1 | 9/2012 | Blockley |
| 2012/0269509 A1 | 10/2012 | Hultermans |
| 2012/0317426 A1 | 12/2012 | Hunter, Jr. |
| 2012/0319485 A1 | 12/2012 | Ewing |
| 2013/0003677 A1 | 1/2013 | Yu |
| 2013/0039629 A1 | 2/2013 | Krampotich et al. |
| 2013/0051440 A1 | 2/2013 | Rofougaran |
| 2013/0084050 A1 | 4/2013 | Vastmans |
| 2013/0114930 A1 | 5/2013 | Smith |
| 2013/0146355 A1 | 6/2013 | Strasser |
| 2013/0170801 A1 | 7/2013 | Do |
| 2013/0215804 A1 | 8/2013 | Lu |
| 2013/0294735 A1 | 11/2013 | Burris |
| 2013/0308915 A1 | 11/2013 | Buff |
| 2013/0340361 A1 | 12/2013 | Rogers |
| 2014/0168842 A1 | 6/2014 | Martinez |
| 2014/0219622 A1 | 8/2014 | Coan |
| 2014/0248028 A1* | 9/2014 | Campbell ............ G02B 6/4452 385/135 |
| 2014/0314388 A1 | 10/2014 | Alberts |
| 2014/0376909 A1 | 12/2014 | Frisken |
| 2015/0006095 A1 | 1/2015 | Voisine |
| 2015/0109710 A1 | 4/2015 | Politis |
| 2015/0155669 A1 | 6/2015 | Chamberlain |
| 2015/0155706 A1 | 6/2015 | Miller |
| 2015/0168974 A1 | 6/2015 | Mascarenhas |
| 2015/0185430 A1* | 7/2015 | Jin ...................... G02B 6/4448 385/135 |
| 2015/0234405 A1 | 8/2015 | Chamberlain |
| 2015/0334476 A1 | 11/2015 | Smith |
| 2016/0043806 A1 | 2/2016 | Maricevic |
| 2016/0139355 A1* | 5/2016 | Petersen ............ G02B 6/4478 385/100 |
| 2016/0231524 A1* | 8/2016 | Womack ............. G02B 6/4452 |
| 2016/0259129 A1* | 9/2016 | Geens .................. G02B 6/4455 |
| 2016/0342168 A1 | 11/2016 | Chamberlain et al. |
| 2017/0123175 A1 | 5/2017 | Van Baelen |
| 2018/0159319 A1 | 6/2018 | Miller |
| 2018/0213091 A1 | 7/2018 | Kostakis |
| 2018/0231731 A1 | 8/2018 | Bakatsias |
| 2019/0258280 A1 | 8/2019 | Chamberlain |

FOREIGN PATENT DOCUMENTS

| | | |
|---|---|---|
| DE | 102012008923 B4 | 9/2014 |
| DE | 102011111288 B4 | 3/2018 |
| DE | 102011111399 B4 | 5/2018 |
| EP | 0 095 539 A1 | 12/1983 |
| EP | 0 942 303 A1 | 9/1999 |
| EP | 1 855 365 A1 | 11/2007 |
| EP | 2005854158 | 11/2007 |
| EP | 2 469 661 A1 | 6/2012 |
| GB | 0637657 A | 5/1950 |
| GB | 2421641 A | 6/2006 |
| GB | 2452780 A | 3/2009 |
| JP | 2005 317472 A | 11/2005 |
| KR | 10-2010-0048227 A | 5/2010 |
| KR | 10-2010-0069332 A | 6/2010 |
| WO | 2006/076120 A1 | 7/2006 |
| WO | 2008/059212 A1 | 5/2008 |
| WO | 2010/024847 A2 | 3/2010 |
| WO | 2012/038104 A1 | 3/2012 |
| WO | 2012/108929 A1 | 8/2012 |
| WO | 2012/108930 A1 | 8/2012 |
| WO | 2013/055591 A2 | 4/2013 |
| WO | 2013/165657 A1 | 11/2013 |
| WO | 2014/009255 A1 | 1/2014 |
| WO | 2014/118227 A1 | 8/2014 |
| WO | 2014/134154 A1 | 9/2014 |
| WO | 2018/136812 A1 | 7/2018 |

OTHER PUBLICATIONS

International Search Report and Written Opinion for PCT/US11/064704; dated May 16, 2012; 13 pages.

International Search Report and Written Opinion for PCT/US11/064717: dated May 16, 2012; 14 pages.

International Search Report and Written Opinion for PCT/US2018/014553 dated Apr. 6, 2018; 11 pages.

Preliminary Report on Patentablity and Written Opinion of the International Searching Authority for PCT/US2011/064704; dated Aug. 13, 2013.

Preliminary Report on Patentablity and Written Opinion of the International Searching Authority for PCT/US2011/064717; dated Aug. 13, 2013.

FIS the Solutionists, High Denisty C-Ran CPRI Interface Panel, product catalog, Rev. A 5/15, pp. 1-2, Oriskany, New York.

Written Opinion for PCT/US11/064704; dated May 16, 2012.

Written Opinion for PCT/US11/064717; dated May 16, 2012.

CPRI Link Mobile Field Testing; AES (Advanced Embedded Solutions), aes-eu.com; Jun. 14, 2014; retrieved from the Internet Jun. 8, 2017 at <http://aes-eu.com/mobile-field-testing.php>; 4 pages.

FIS, the Solutionists, "High Density C-ran CPRI Interface Panel" Product Catalog, Rev. A; May 2015; Oriskany, New York; 2 pages.

FIS, the Solutionists, CPRI Interface Panel Drawer with Integrated Cable Management; Sep. 27, 2015; ubeity.squarespace.com; Rev. A 3-2; 2 pages.

Müller, Ulrich, Deploying and Managing New Cell Sites with FRR; Apr. 4, 2015; Telcom Infra Event; <http://telecominfraonline.nl/deploying-managing-new-cell-sites/>; 21 pages.

Williams, et al. "2-Wire Virtual Remote Sensing for Voltage Regulators—Clairvoyance Marries Remote Sensing" Linear Technology Brochure, Application Note 126, Oct. 2010; www.linear.com; pp. AN126-1-AN126-22.

International Search Report and Written Opinion for PCT/US2015/013740 dated Apr. 28, 2015; 17 pages.

International Search Report and Written Opinion for PCT/US2016/022575 dated Aug. 17, 2016; 14 pages.

GE Product Data Sheet, CP2000DC54-PE Compact Power Line DC/DC Converter, Aug. 20, 2013, www.ge.com/powerelectronics; 15 pages.

Keithley Product Sheet, Single-Channel Programmable DC Power Supplies, Series 2200, undated; www.keithly.com; 4 pages.

* cited by examiner

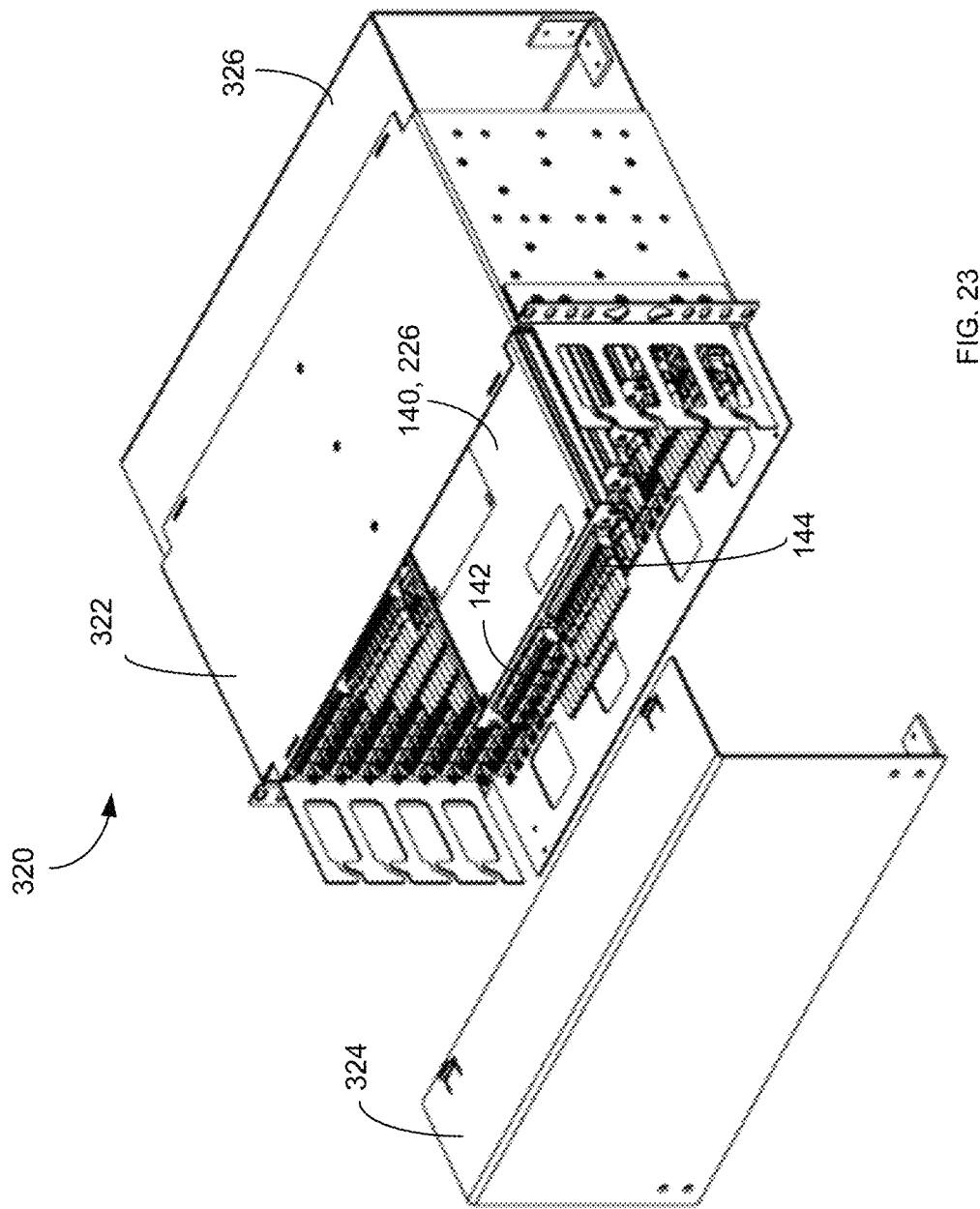

FIBER OPTIC CABLE MANAGEMENT SYSTEM

CROSS-REFERENCE TO RELATED APPLICATIONS

This application is a continuation-in-part of U.S. application Ser. No. 14/931,699, filed Nov. 3, 2015, the entire disclosure of which is incorporated herein by reference.

COPYRIGHT

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND OF THE INVENTION

As the mobile communication networks evolve, the load of the installed transmitting equipment at the edges of the network (mobile base stations) increases and the frequency allocation becomes denser in order to support the large demand for capacity. These high interference environments impose challenges to network design and maintenance engineers. Reducing the impact of interference is important for network performance in terms of Quality of Service (QoS) and user experience. Troubleshooting the interference proves to be a complicated and expensive procedure as field operations, including tower climbing, require extensive engineering experience and long system down times.

To reduce the operational expenditures and optimize this cost and resource consuming procedure, a new instrument technology was developed to retrieve RF data (I/Q) between the Remote Radio Unit (RRU) and the Baseband Unit (BBU). This technology provides direct access to the Radio Unit's received signal over the optical communication link.

Installing an easily accessible optical tap, network engineers can efficiently analyze the power spectrum on the uplink of the antenna from the ground level eliminating system downtime. This optical tap solution is efficient if the network infrastructure allows the installation of additional optical taps. However, Central Offices of Centralized Radio Access Networks (C-RANs) and Distributed Radio Access Networks (D-RAN) base station shelters may not have sufficient space for optical tap installations. In the case of C-RAN, it may not be possible to access the optical cables at the edge of the network, close to the active RF equipment. In the case of D-RAN outdoor or dense indoor installations, it also may not be possible to install additional optical taping equipment.

BRIEF DESCRIPTION OF THE DRAWINGS

FIG. 23 shows a 4 RU enclosure that holds optical fiber modules.

DETAILED DESCRIPTION

Several preferred examples are described with reference to the accompanying drawings. Various other examples are also possible and practical. The modular fiber optic cable tapping and management system may be exemplified in many different forms and should not be construed as being limited to the examples set forth.

A modular fiber optic cable management system (management system) integrates fiber optic cable management and fiber optic cable modules into a single compact subrack that can be installed in outdoor cabinets and high density indoor frames. The management system includes removable optical taps, a compartment for the insertion of the optical taps, a fiber cable routing mechanism, an excess fiber length storage compartment, a sliding mechanism to facilitate installation and maintenance operations, and pass through adaptors to enable direct connection bypassing the tap modules.

Figure 1:
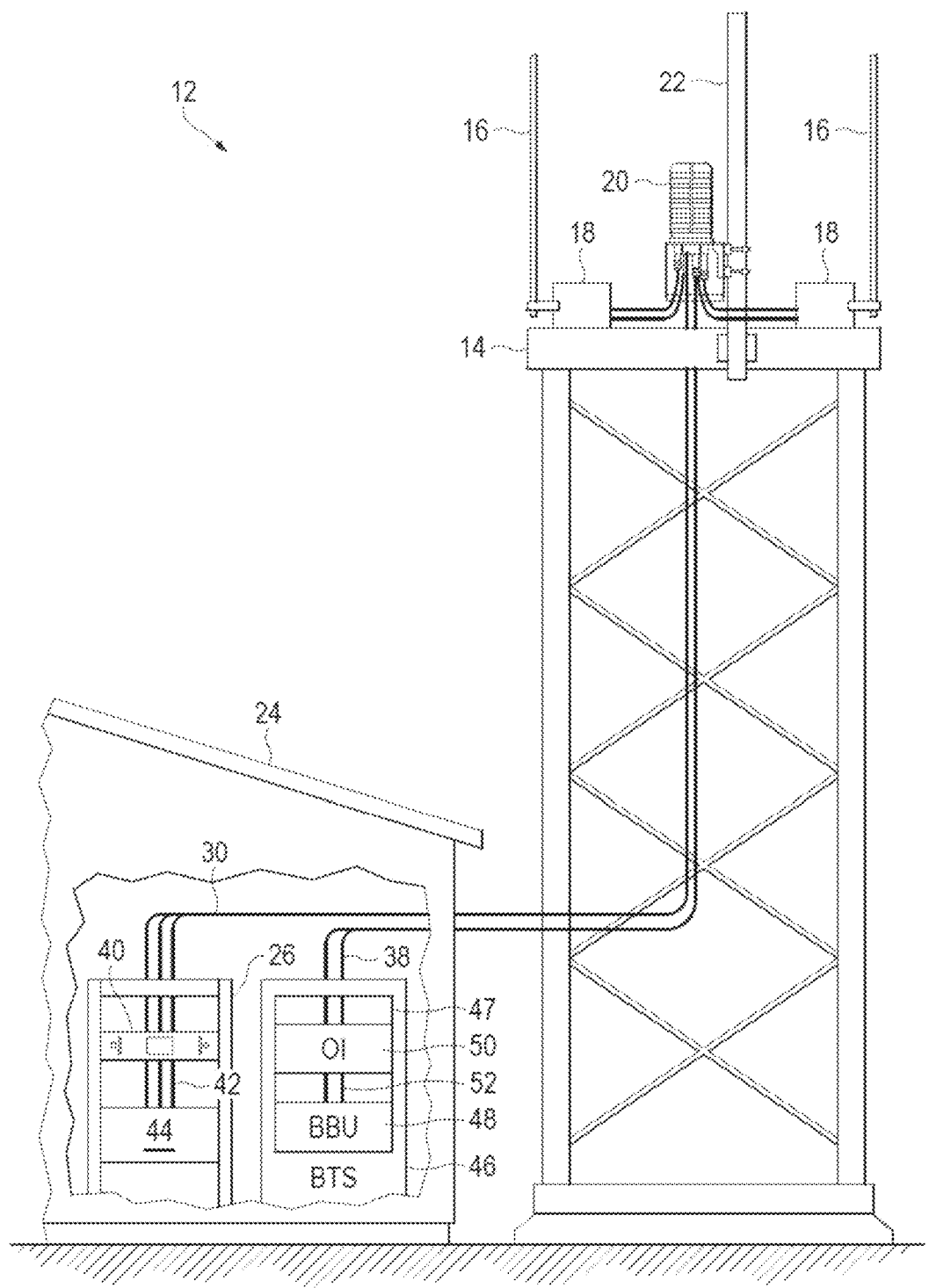
FIG. 1 shows a communication system that uses a modular fiber optic cable management system (management system).

FIG. 1 illustrates an example distributed wireless communication system 12. A building 24 contains computing equipment for a base transceiver communication station (BTS) 46. BTS 46 may be contained in a rack 47. A fiber to the antenna (FTTA) architecture connects communication station 46 through fiber optic (FO) cables 38 to different remote radio units (RRUs) 18 located on the top of a tower 14.

The FTTA architecture reduces signal loss over FO cables 38 by moving radio frequency (RF) circuits from BTS 46 to RRUs 18 and closer to radio transceiver antennas 16. The RRUs 18 communicate with a baseband unit (BBU) 48 in BTS 46 through bidirectional (Tx/Rx) low loss optical fiber links in FO cables 38 using a transmission protocol such as common public radio interface (CPRI), open base station architecture initiative (OBSAI).

In order to protect active equipment ports and enhance system flexibility (reconfiguration & maintenance), FO cables 38 are usually not directly terminated on BBU 48 but terminated on an intermediate optical interface (OI) subrack 50 contained on rack 47. Common fiber patchcords 52 then connect optical interface 50 to baseband unit 48.

In other examples, radios 18 may be located on the top of a building that also house DC power plant 44 and communication station 46. In another configuration, radios 18 and associated antennas 16 are located at different corners on the roof of a building.

A direct current (DC) power plant 44 is connected through a DC power bus 42 and DC power cables 30 to the different radios 18 on tower 14. A remote suppression unit 20 may be attached to a support 22 on top of tower 14 and connected to the remote ends of power cables 30 proximate to radios 18 and antennas 16.

A local rack based suppression unit 40 is located inside of building 24 and connected to the opposite local ends of power cables 30 relatively close to DC power plant 44 and communication station 46. In one embodiment, suppression unit 40 is located in a rack 26 that also contains DC power plant 44. In another example, suppression unit 40 is located in another rack or some other location next to power plant 44.

Suppression and optical fiber units are described in the following patents which are all incorporated by reference in their entireties:

Patent application Ser. No. 12/984,304 filed Jan. 4, 2011, entitled: OVERVOLTAGE PROTECTION SYSTEM FOR RADIO HEAD-BASED WIRELESS COMMUNICATION SYSTEMS;

Patent application Ser. No. 13/005,275 filed Jan. 12, 2011; entitled: OVERVOLTAGE PROTECTION FOR REMOTE RADIO HEAD-BASED WIRELESS COMMUNICATIONS SYSTEMS; and Patent application Ser. No. 13/301,685 filed Nov. 21, 2011; entitled: MODULAR AND WEATHER RESISTANT OVERVOLTAGE PROTECTION SYSTEM FOR WIRELESS COMMUNICATION SYSTEMS.

Figure 2:
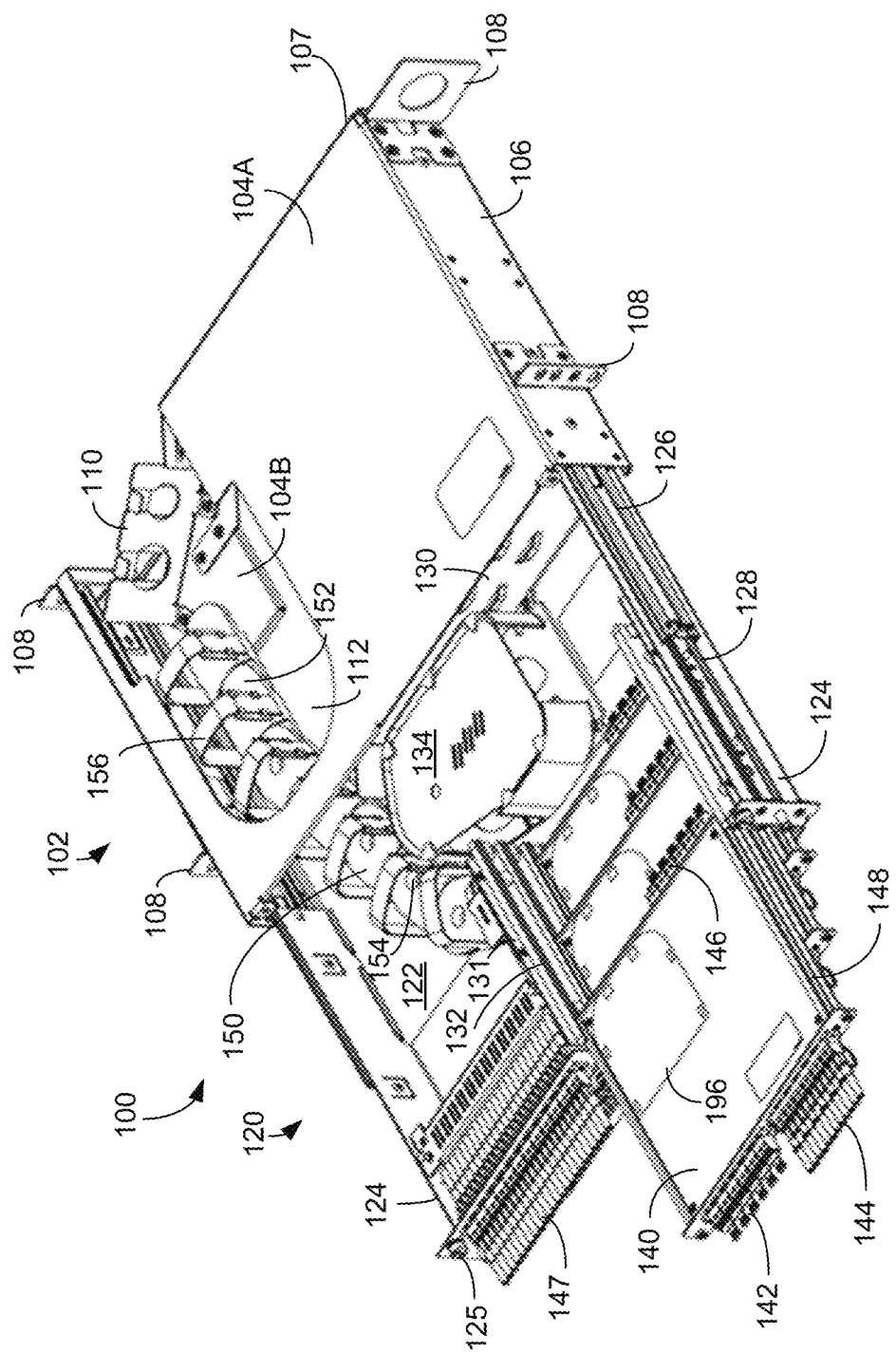
FIG. 2 shows a perspective view of the management system.

FIG. 2 depicts an example fiber optic cable tapping and management system (management system) 100 that provides more effective network maintenance and troubleshooting, such as fiber physical integrity investigation, attenuation spatial resolution, etc. Cable management system 100 allows access to FO cables 38 and 52 in rack system 47 that may not normally be accessible, improving fiber optic cable monitoring and maintenance in more diverse locations.

Management system 100 may be located in the OI subrack 50 that attaches to rack 47 in FIG. 1. In another example, management system 100 may be located in a subrack within an outdoor cabinet structure. In one example, subrack 50 may include an enclosure 102 with top and bottom walls 104A and 104B, respectively, with side walls 106 and a back wall 107. Attachment members 108 may extend out from side walls 106 for attaching to the rack or cabinet structure.

A tray 120 may slidingly insert into enclosure 102. Tray 120 may include a bottom floor 122 with vertically extending side walls 124, a front plate 125, and a back wall 130. Sliders 126 may attach to the inside surfaces of enclosure side walls 106 and mating sliders 128 may attach to the outside of tray side walls 124. Sliders 126 may slidingly reciprocate in brackets attached to the inside of enclosure side walls 106 and sliders 128 may slidingly reciprocate in sliders 126.

Tray 120 may retain one or more optical fiber modules 140 that include fiber optic splitters. This is just one example, and optical fiber modules 140 may contain any other type of fiber optic device, such as an optical multiplexer/de-multiplexer as described in more detail below. Modules 140 may include rails 148 that horizontally slide in and out of tracks 132 attached to a divider wall 131 and side wall 124 of tray 120. Fiber modules 140 may include ports 142 that connect to BBU 48 in FIG. 1, ports 146 that connect to RRUs 18 in FIG. 1, and ports 144 that serve as taps into the fiber optic lines connected to ports 146 and 144. Tray 120 also may include a cable housing 134 with a spool for holding excess cable.

Pass-through adaptors 147 extend out of a front plate 125 of tray 120 and provide pass through connections for certain optical links that are not tapped. In that case, the fiber optic cables are connected directly to pass-through adaptors 147, bypassing module 140. Pass through adaptors 147 also may provide a cascade connection to an external signal processing unit that processes digital optical signals or demodulates RF signals as shown in more detail below.

A cable guide 150 may include a series of chain links 152 that each pivot or rotate about connectors 154. Each link 152 includes a hoop 156 for retaining optic fibers. Cable guide 150 is rotatably connected at a first end to a portion of enclosure bottom wall 104B and rotatably connected at a second opposite end to floor 122 of tray 120.

Chain links 152 allow cable guide 150 to uncurl and extend forward when tray 120 is pulled out of enclosure 102 and retract and curl up when tray 120 is inserted back into enclosure 102. A middle portion of cable guide 150 is suspended between enclosure bottom wall 104B and tray floor 122 when tray 120 is pulled out of enclosure 102. The middle portion of cable guide 150, along with any optical fibers, slides and curls up onto tray floor 122 when tray 120 is pushed back into enclosure 102. Cable guide 150 controls the bend radius of the optical fibers and protects thin breakout cable tails.

A cable holder 110 is attached to enclosure bottom wall 104B and supports a break out device that separates out optical fibers from a fiber optic cable. Cable holder 110 securely holds the cable and optical fibers to the back end of enclosure 102.

Figure 3:
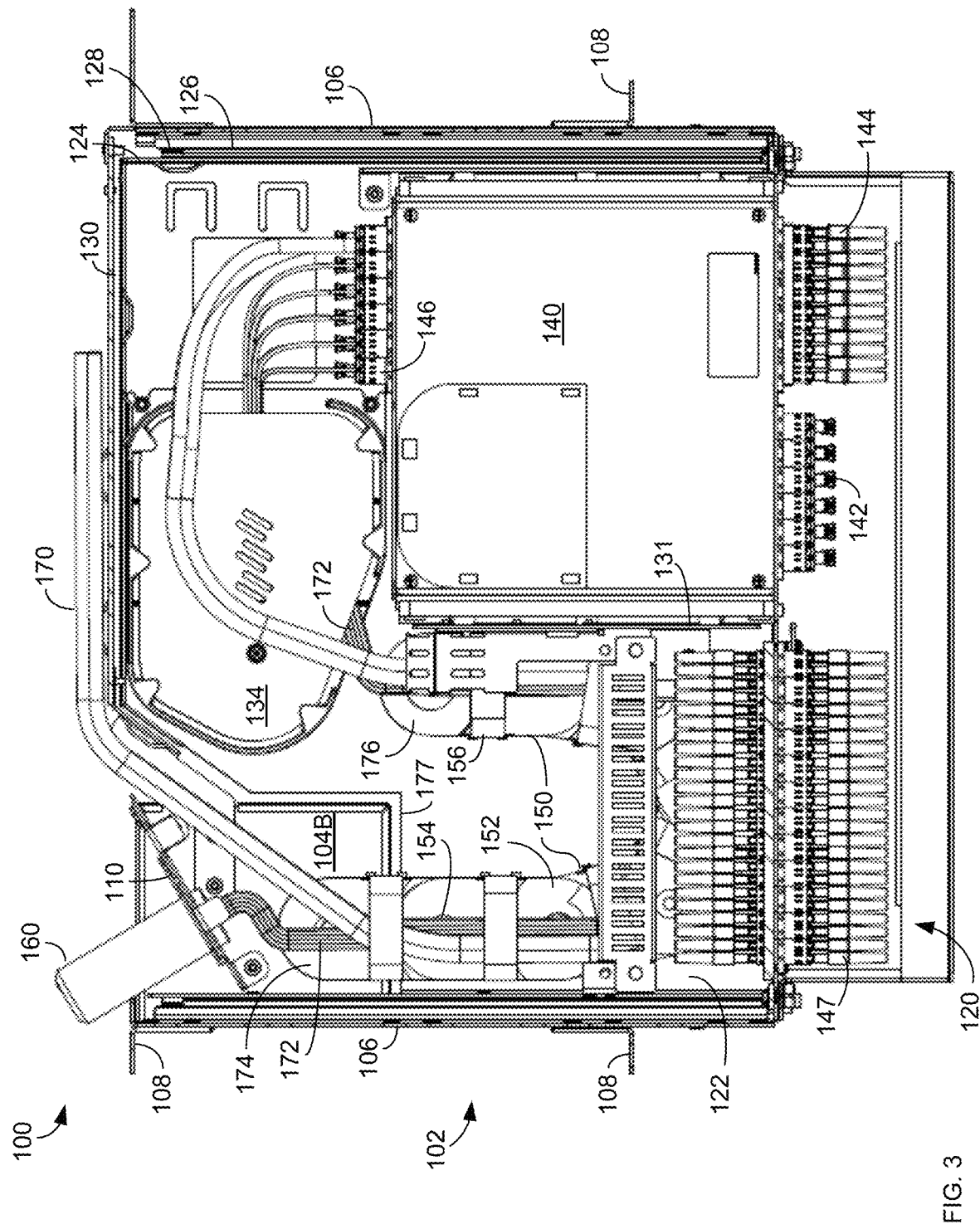
FIG. 3 shows a top plan view of the management system.

FIG. 3 shows a top view of cable management system 100 with a removed top cover. In this example, tray 120 is shown in a retracted position fully inserted inside of enclosure 102. As mentioned above, cable holder 110 retains a breakout device 160 that separates out individual optical fibers 172 from a fiber optic cable (not shown). Separate larger diameter fiber optic jumper cables 170 each may contain a pair of optical fibers connected to RRUs 18 located relatively close to BTS 46.

Cable guide 150 retains both optical fibers 172 and jumper cables 170. Cable guide 150 may provide minimum bend radius protection during storage and sliding and accommodate both thin (up to 3 mm) breakout cable tails and up to 7 mm fiber optic jumpers.

First end 174 of cable guide 150 is rotatably connected to bottom wall 104B of enclosure 102 and second end 176 of cable guide 150 is rotatably connected to bottom floor 122 of tray 120. With tray 120 in the inserted position, a notch 177 in bottom floor 122 abuts up against bottom floor section 104B. At the same time, cable guide 150 curls or bends into a "U" shape between a left side of tray 120 and divider wall 131 that extends along the left sides of fiber modules 140. Extra lengths of optical fibers 172 can be wrapped around a spool located inside of a cable housing 134.

As tray 120 is pulled out of enclosure 102, second end 176 of cable guide 150 is pulled forward by bottom floor 122 while first end 174 remains securely attached to bottom wall 104B of enclosure 102. Individual chain links 152 rotate about connectors 154 allowing cable guide 150 to at least partially straighten out.

Because cable housing 134 and fiber modules 140 are also both attached to tray bottom floor 122, a substantially same distance is maintained between second end 176 of cable guide 150 and RRH ports 146 extending from the back end of fiber modules 140. As tray 120 is pulled out of enclosure 102, optical fibers 172 and fiber optic cables 170 can extend forward by uncoiling from the u-shaped configuration inside of cable guide 150 as shown in FIG. 2 without applying stress to connections at RRU ports 146.

Allowing tray 120 to move fiber modules 140 outside of enclosure 102 provide substantial advantages. For example, the subrack containing fiber optic cable management system 100 can be located in more confined spaces with limited rear access. A technician can access RRU ports 146 on the back ends of fiber modules 140 simply by pulling tray 120 out of enclosure 102. Technicians can also access the ends of optical fibers 172 and fiber optic cables 170 at the back end of enclosure 102 via an opening 112 (FIG. 2) in upper wall 104A.

Thus, technicians can access substantially every device and connection in enclosure 102 and the entire length of optical fibers 172 and fiber optic cables 170 either through the top of tray 120 or through opening 112 in enclosure 102. Each fiber module 140 can also be individually slid out from tray 120 allowing the technician to also access all RRH ports 146 from each fiber module 140.

Figure 4:
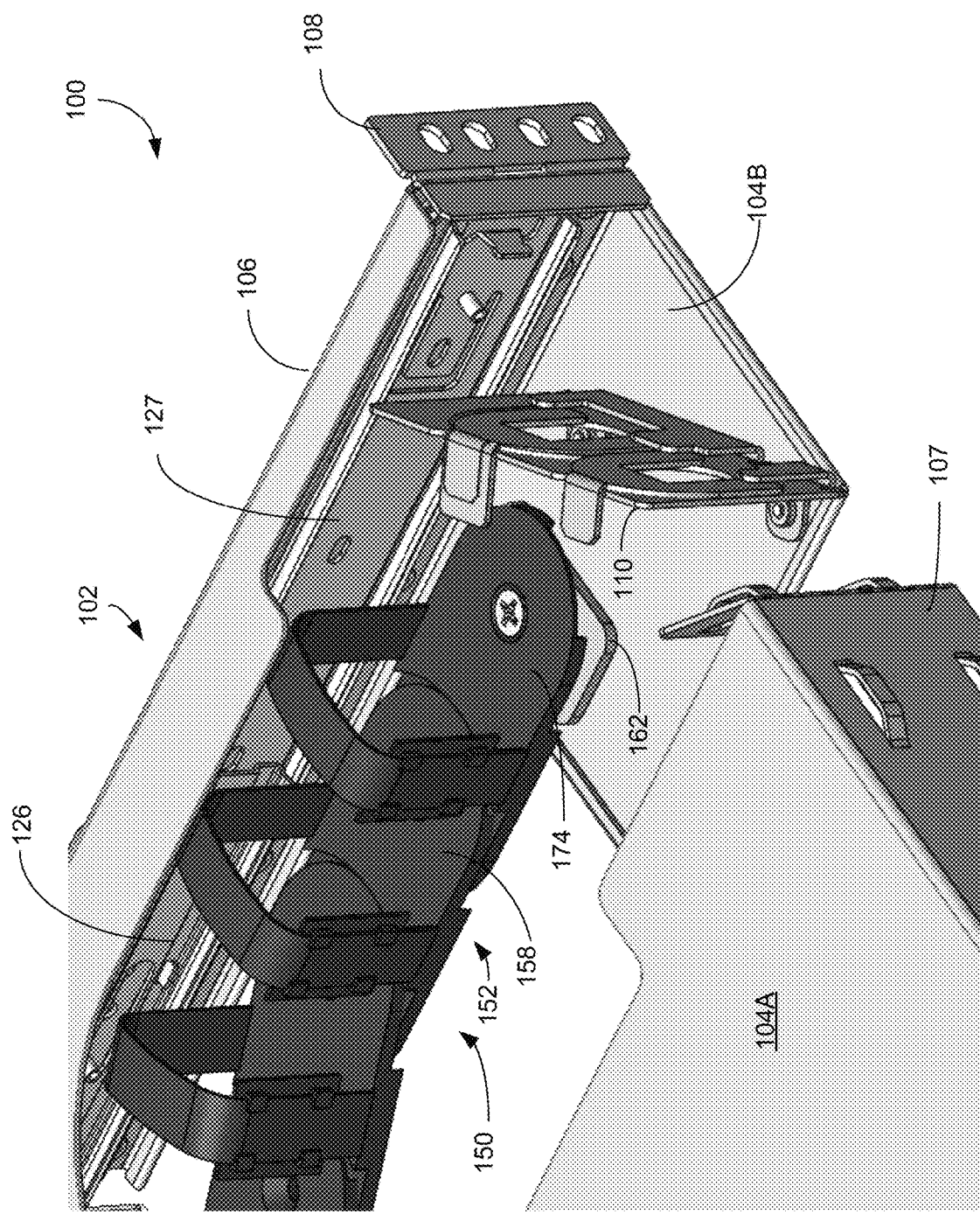
FIG. 4 shows a top perspective view of a back corner of a subrack that holds the management system.
Figure 5:
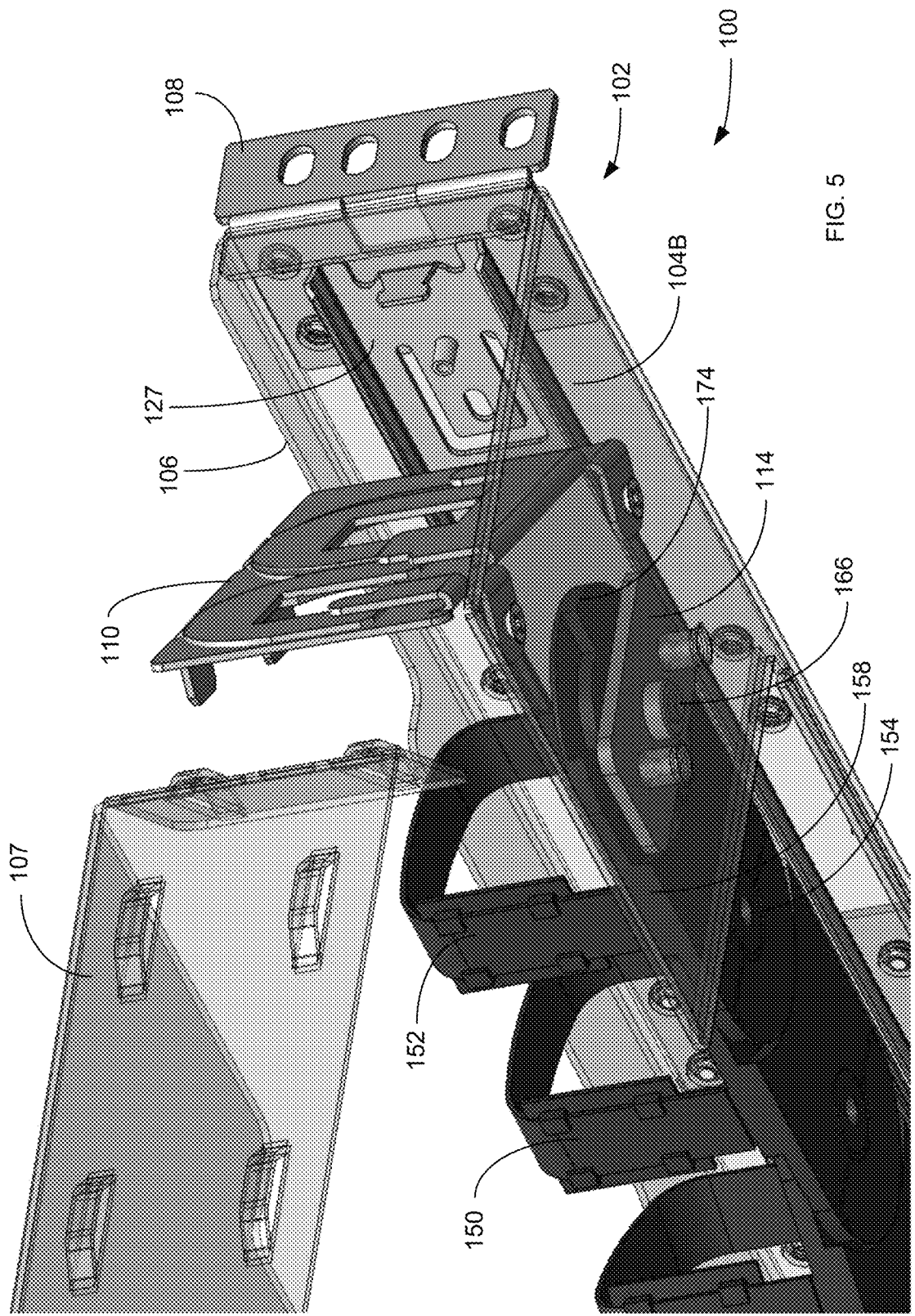
FIG. 5 shows a bottom perspective view of the back corner of the subrack that holds the management system.

FIG. 4 shows a perspective top view for a section of the back end of cable management system 100 and FIG. 5 shows a perspective partially transparent bottom view for the section of the back end of cable management system 100. Referring to FIGS. 4 and 5, cable holder 110 is attached to bottom wall 104B in a space formed between back wall 107 and side wall 106 of enclosure 102. A bracket 127 is attached alongside wall 106 and slidingly retains slider 126.

A mounting plate 114 includes a swivel 166 for rotationally holding first end 174 of cable guide 150. In one example, each chain link 152 may include an oval shaped platform 158 with rounded opposite stepped front and back ends. The upper stepped end of a first chain link 152 may overlap and rotationally connect with a lower stepped end of a second adjacent chain link 152.

FIGS. 6-10 show different configuration options for fiber management system 100. In FIGS. 6-10 the uplink (UL) optical fibers are shown as dashed lines and the downlink (DL) optical fibers are shown as solid lines.

Figure 6:
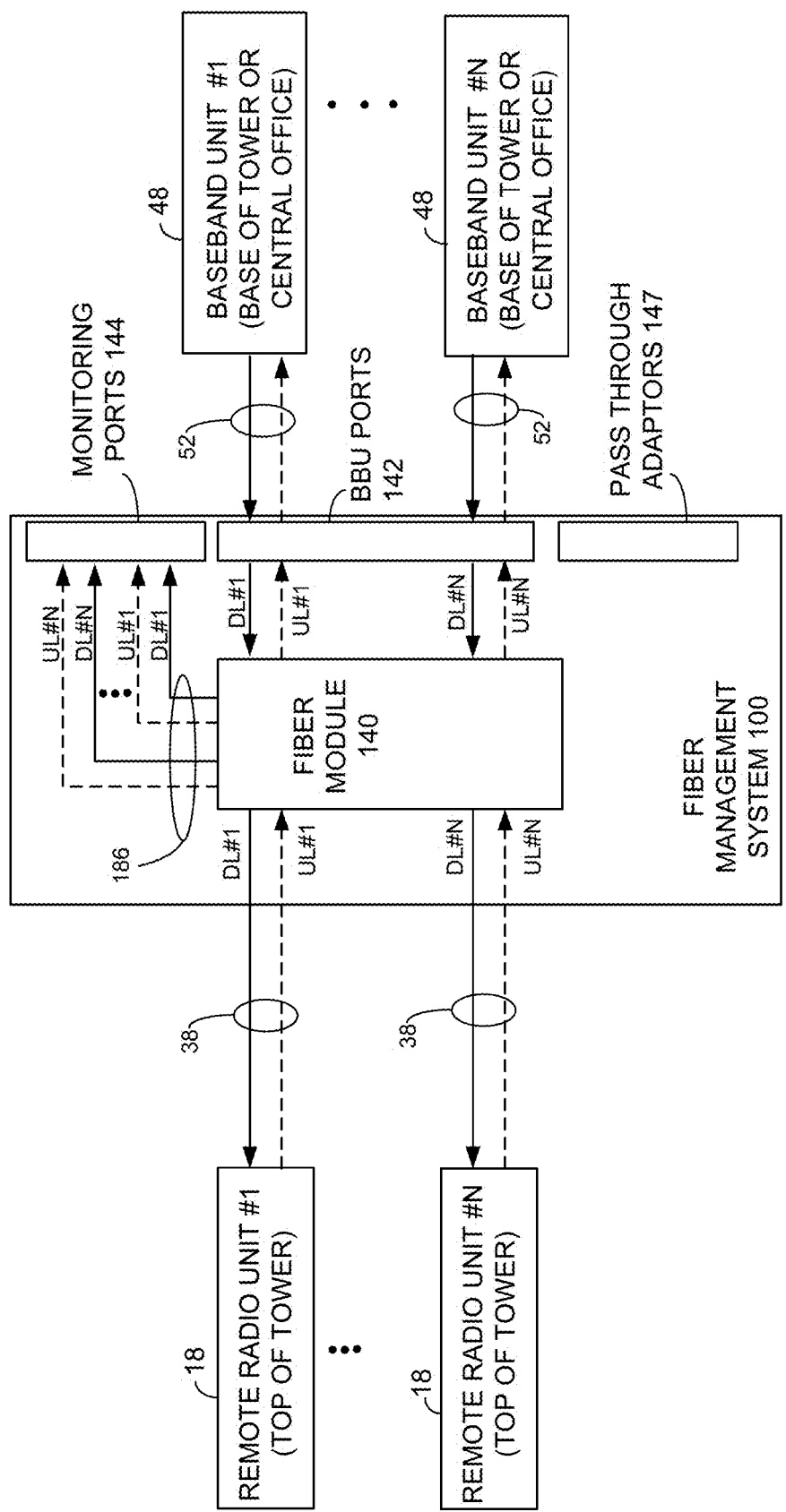
FIG. 6 is a block diagram that shows a connection configuration for the management system.

Referring first to FIG. 6, fiber optic cables 38 coming from RRUs 18 are connected to the back side of fiber modules 140. The optical fiber patchcords 52 coming from BBUs 48 are connected to BBU ports 142 on the front side of module 140. The tapped optical fibers 186 are accessed through monitoring ports 144 on the front side of fiber module 140 as shown above. In this configuration, pass through adaptors 147 are not used.

Figure 7:
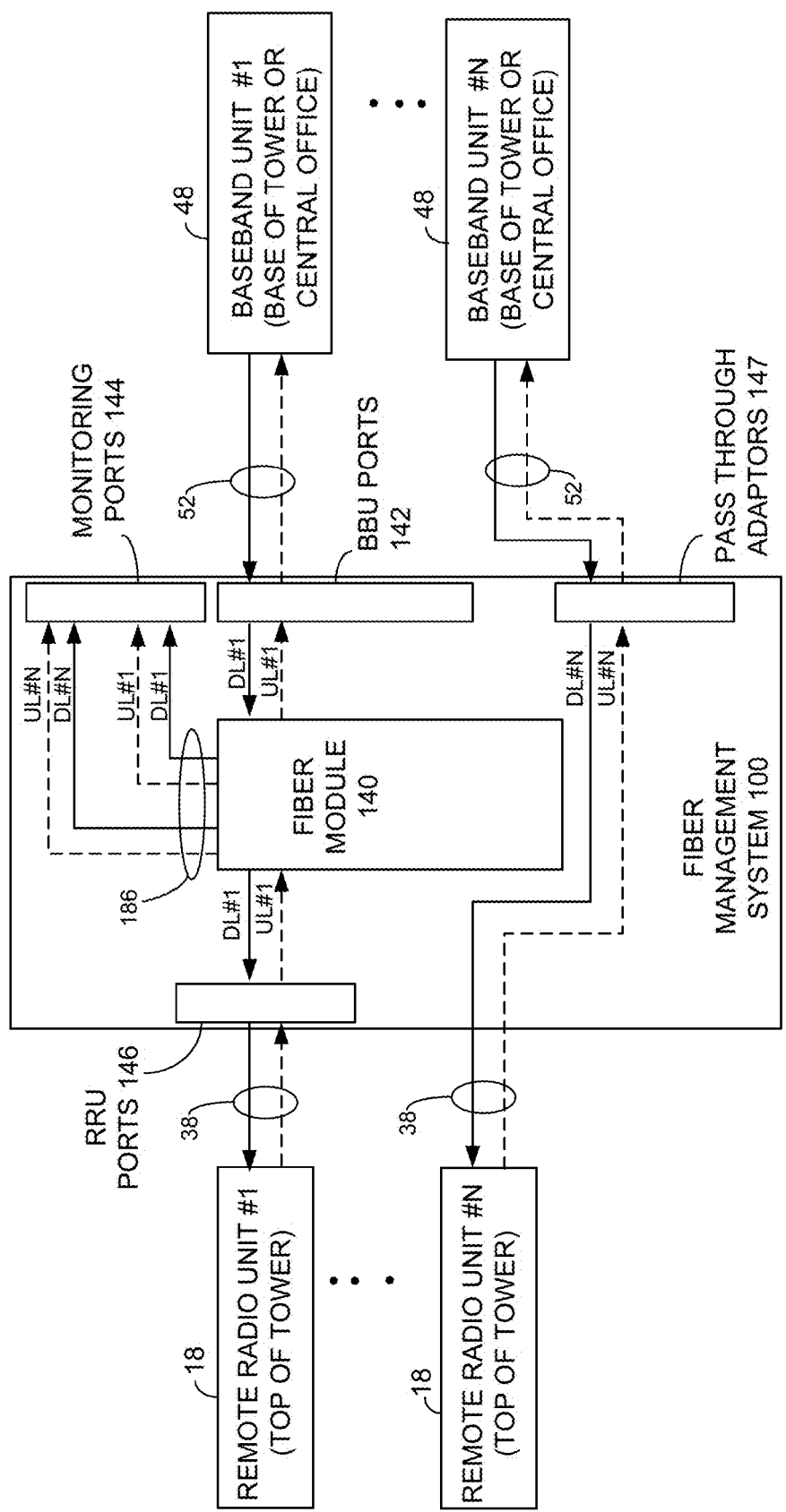
FIG. 7 is a block diagram that shows another connection configuration for the management system.

FIG. 7 shows a second connection configuration where optical fibers are connected to fiber module 140 and/or to pass through adaptors 147. Fiber optic cables 38 coming from RRUs 18 are connected either to the back side of module 140 and/or connected to the back side of pass through adaptors 147.

Optical fibers 52 coming from baseband units 48 are connected either to BBU ports 142 on the front side of fiber module 140 and/or to pass through adaptors 147. The optical signals on optical fibers 38 and 52 can be tapped and monitored through monitoring ports 144. Pass through adaptors 147 provide direct fiber optic connections between baseband units 48 and RRUs 18 bypassing fiber module 140. Fiber module 140 also may be bypassed when there is an insufficient link budget or the fiber optic signal should not be tapped.

Figure 8:
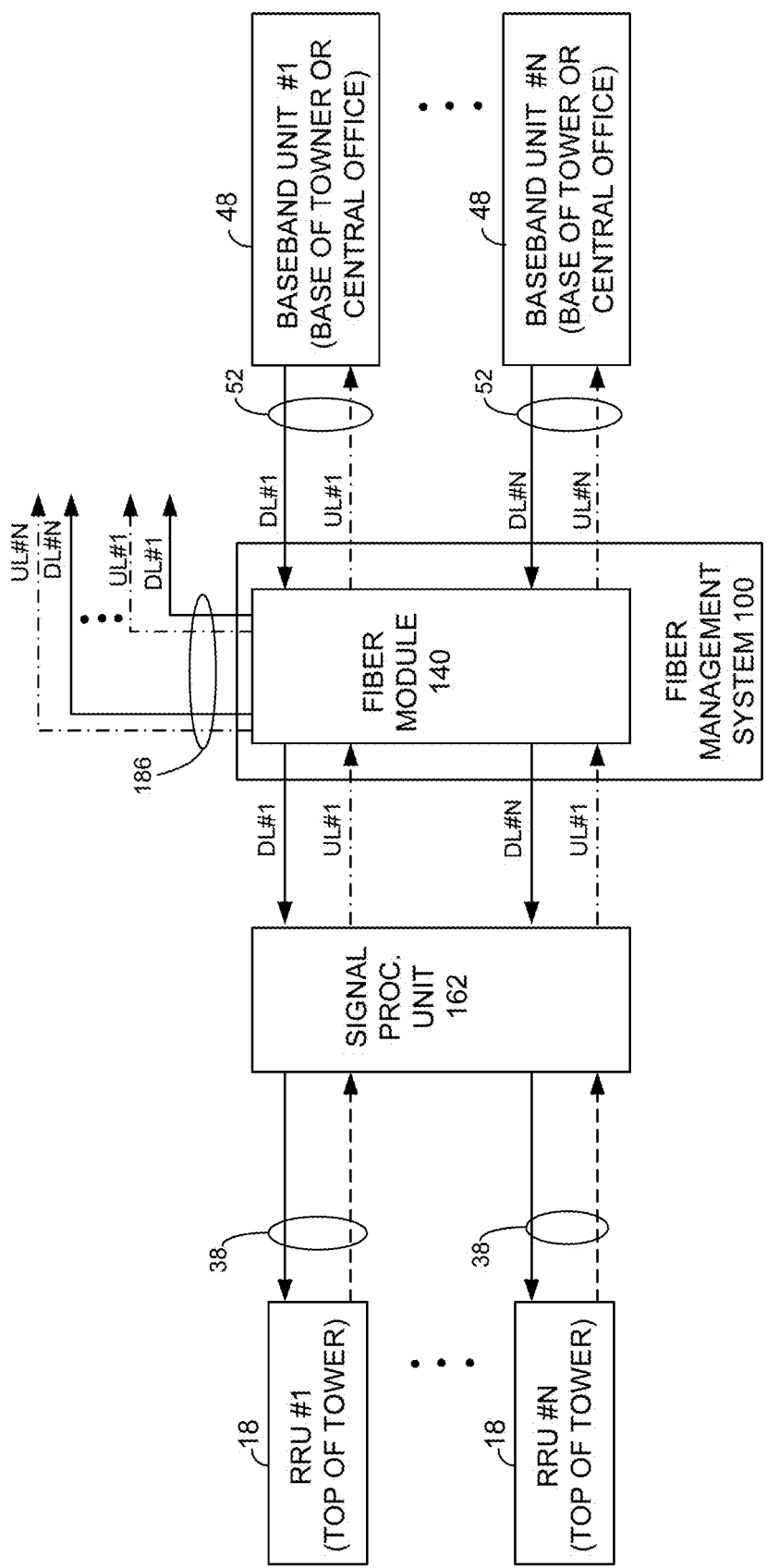
FIG. 8 is a block diagram that shows how a signal processing unit is connected to the management system.
Figure 9:
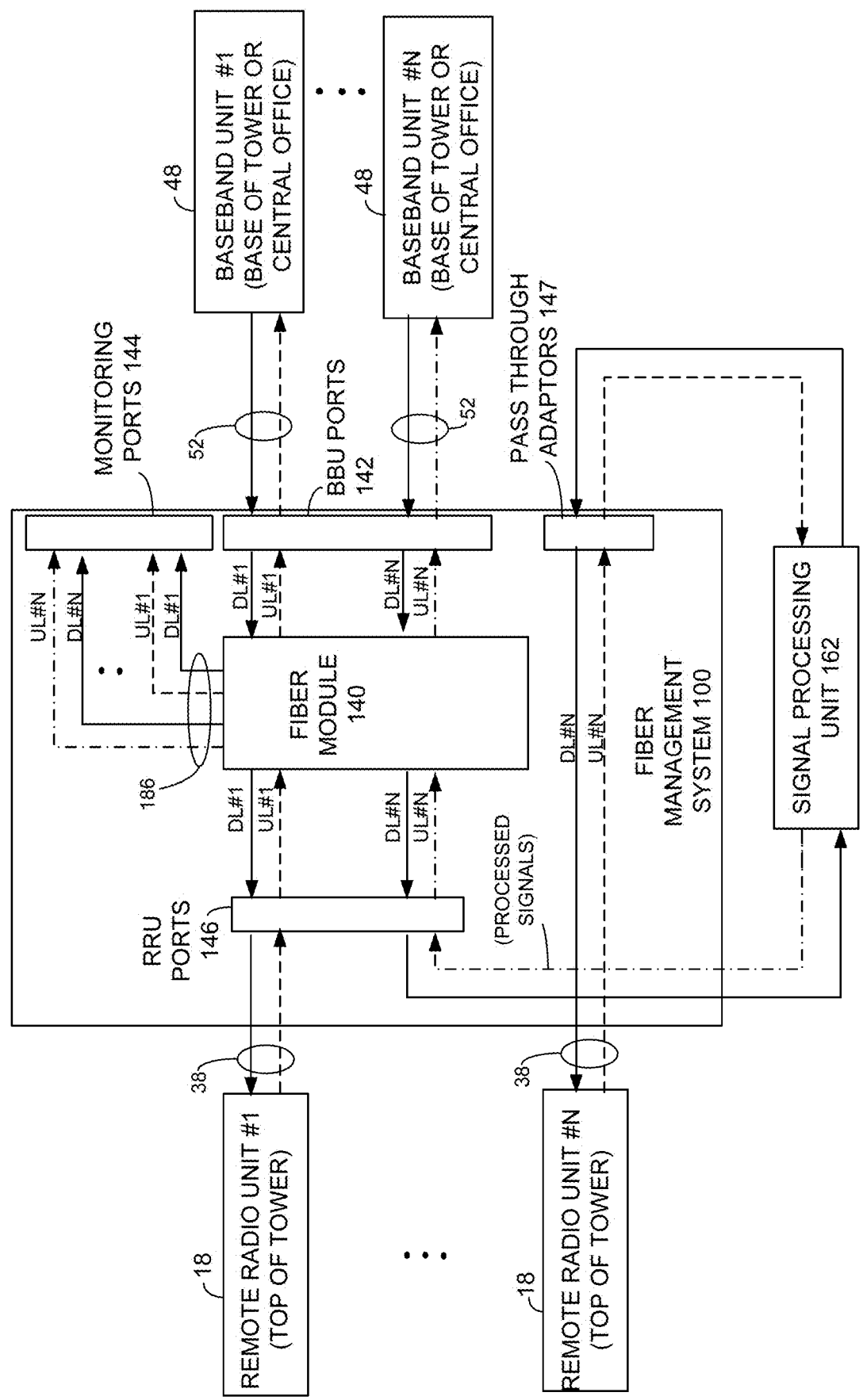
FIG. 9 is a block diagram that shows in more detail how the signal processing unit is connected to the management system.

FIG. 8 shows logical connections for a third configuration for fiber management system 100. A signal processing unit 162 is connected in cascaded/series between RRUs 18 and fiber module 140. An example of signal processing unit 162 is a passive intermodulation mitigation PIM unit. FIG. 9 shows the physical connections between RRUs 18, signal processing unit 162, fiber module 140, and BBUs 48 in more detail.

Referring to FIGS. 8 and 9, fiber optic cables 38 from some of RRUs 18 are connected to the back side of pass through adaptors 147 as described above in FIG. 7. The front side of pass through adaptors 147 is connected to first set of connections on signal processing unit 162.

A second set of connections on signal processing unit 162 are connected to the back side of fiber module 140 through cable guide 150 in cable management system 100 and into RRU ports 146. Signal processing unit 162 may process and filter out interferences in the uplink signals from RRU 18 before the uplink signals reach baseband unit 48. The processed signals are shown in a combined dotted-dashed line. This management system configuration also provides the tapped corrected uplink signal as an output on monitoring ports 144.

Figure 10:
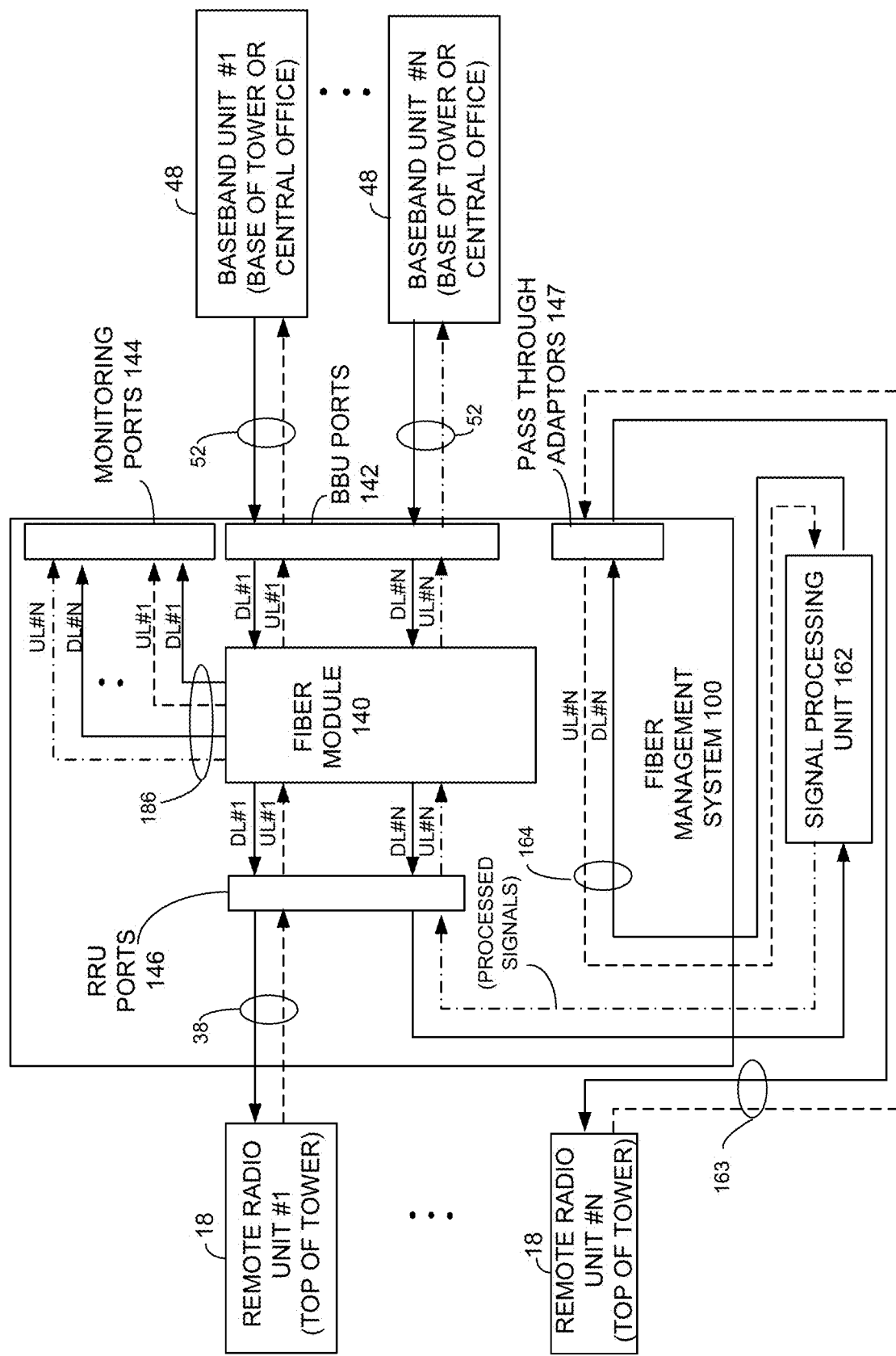
FIG. 10 is a block diagram that shows another configuration for connecting the signal processing unit to the management system.

FIG. 10 shows how optical signals directed to RRUs 18 are processed through 2-fiber jumper cables instead of multifiber trunk cables. Optical fiber jumpers 163 are connected from some RRUs 18 to the front side of pass through adaptors 147 while fiber optic cable assemblies 164 connect the signal processing unit 162 to the rear side of pass through adaptors 147. Signal processing unit 162 may be connected to the back side of the fiber module 140 through cable guide 150 in management system 100 as described above.

Figure 11:
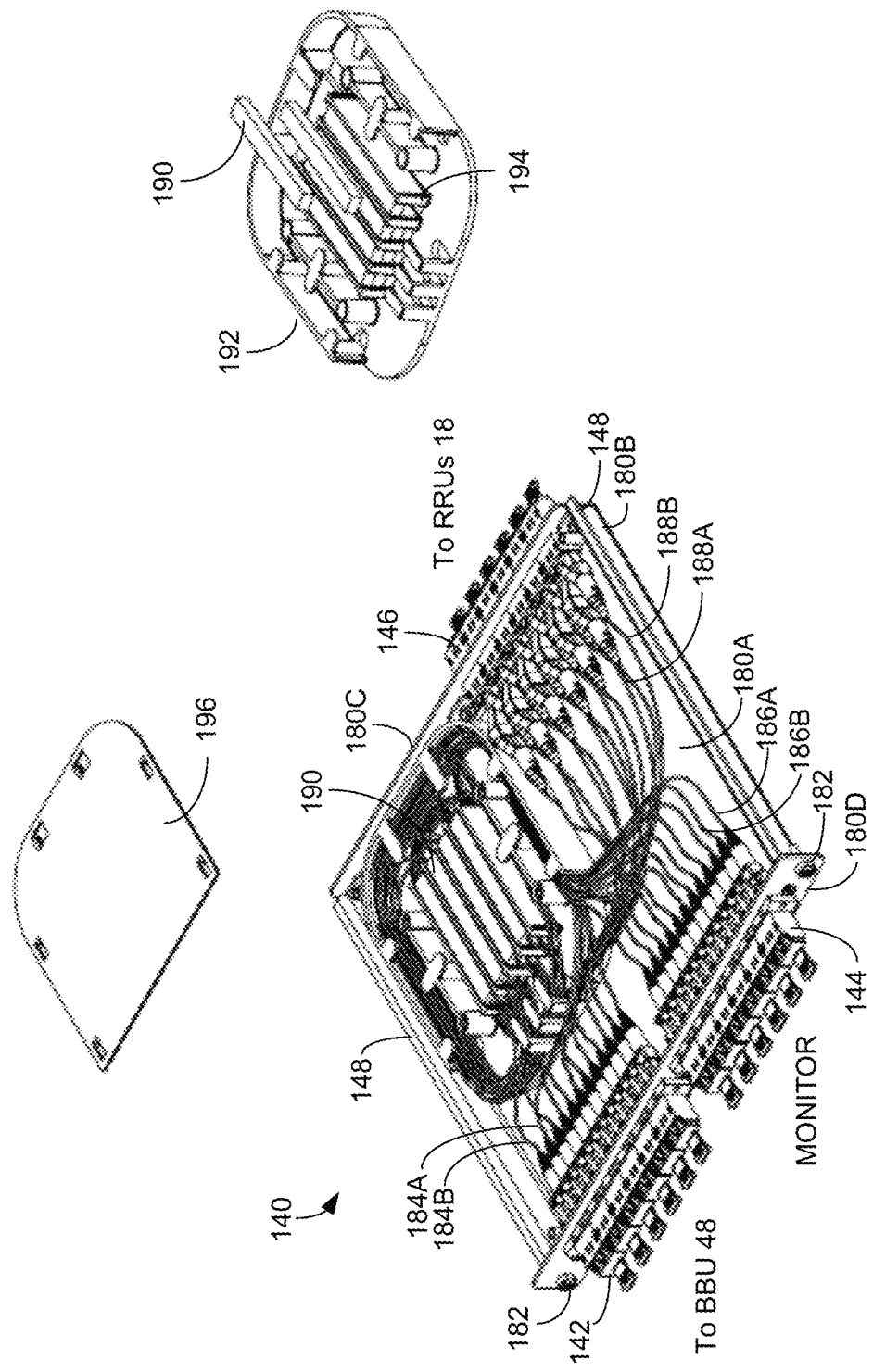
FIG. 11 shows a top perspective view of an optical fiber module used in the management system.

FIG. 11 shows a top perspective view of fiber module 140 with a removed top cover. A container 180 includes a bottom wall 180A, side walls 180B, a back wall 180C, and a front wall 180D. Rail 148 extends out from a top end of side wall 180B and holds fiber module 140 in a slot of tray 120. Screws 182 attach front wall 180D of fiber module 140 to the front face of tray 120.

As mentioned above, ports 146 may connect via optical fibers to RRUs 18, ports 142 may connect via optical fibers to BBU 48, and ports 144 may connect via optical fibers to test and monitoring equipment. Each RRU port 146 may include an uplink port connected to a first fiber splitter 190 via an optical fiber 188A and a downlink port connected to a second fiber splitter 190 via an optical fiber 188B.

Each BBU port 142 may include an uplink port connected to a first fiber splitter 190 via an optical fiber 184B and a downlink port connected to a second fiber splitter 190 via an optical fiber 184A. Each monitor port 144 may include an uplink port connected to a first fiber splitter 190 via an optical fiber 186B and a downlink port connected to a second fiber splitter 190 via an optical fiber 186A.

A holder 192 is attached to bottom wall 180A of fiber module 140. Holder 192 includes multiple vertically extending supports 194 holding opposite sides of fiber splitters 190 in multiple columns. Each fiber splitter 190 may split an uplink fiber optic signal or a downlink fiber optic signal into two separate signals. One of the split signals is connected to monitoring ports 144.

A transparent cover 196, such as a clear plastic, may attach to the top of holder 192. As also shown in FIG. 2, a hole conforming with the shape of cover 196 may be formed in the top cover of fiber module 140. A technician may slide tray 120 out of enclosure 102 as shown in FIG. 2. The technician then may remove cover 196 to access fiber splitters 190. Transparent cover 196 may protect optical splitters 190 while also allowing easier splitter type control and identification. Fiber module 140 may hold up to 12 optical splitters and route the optical fibers to the proper fiber optic interfaces/ports 142, 144, and 146.

Figure 12:
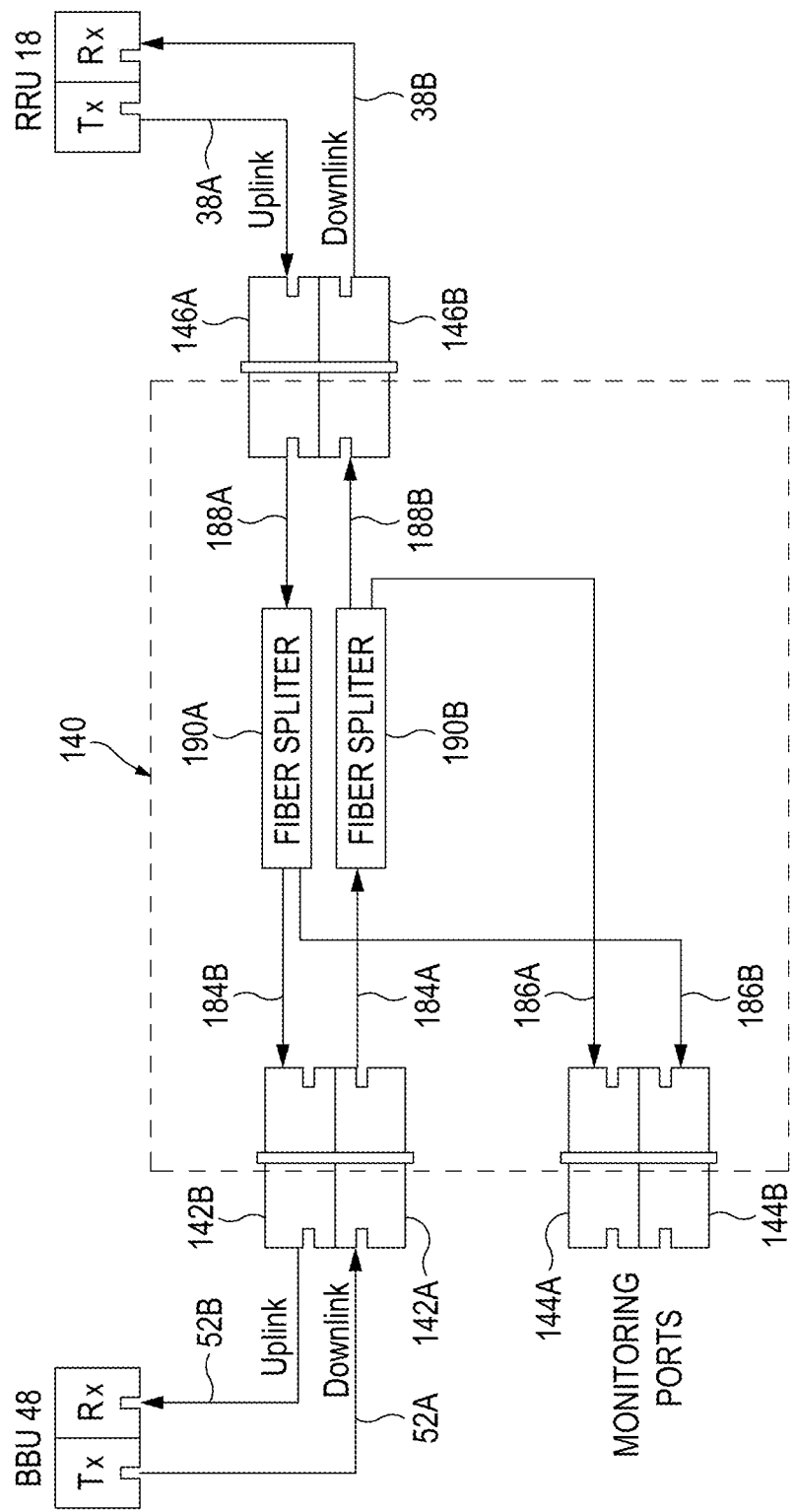
FIG. 12 shows a circuit diagram for the optical fiber module shown in FIG. 11.

FIG. 12 shows an example connection diagram for fiber module 140. Fiber module 140 provides a more effective system for performing network maintenance and troubleshooting operations, such as fiber physical integrity investigation, attenuation spatial resolution, etc. Fiber module 140 avoids the transmission interruptions and unwanted downtime typically associated with testing fiber links.

Fiber optic cables 38 also shown in FIG. 1 may include multiple pairs of uplink optical fibers 38A and downlink fibers 38B each connected to a different RRUs 18. Fiber patchcords 52 also shown in FIG. 1 may include multiple pairs of uplink fibers 52B and downlink fibers 52A connecting to BBU 48.

A first set of interconnection ports 146A and 146B connect uplink optical fiber 38A to a fiber splitter 190A via fiber 188A and connect downlink optical fiber 38B to fiber splitter 190B via fiber 188B, respectively. A second set of interconnection ports 142A and 142B connect uplink fiber 52B to fiber splitter 190A via fiber 184B and connect downlink optical fiber 52A to fiber splitter 190B via fiber 184A, respectively. A third set of monitoring ports 144A and 144B connect to fiber splitter 190B via fiber 186A and connect to fiber splitter 190A via fiber 186B, respectively.

Fiber splitters 190 enable network maintenance without breaking active links between RRUs 18 and BBU 48 thus eliminating downtime. For example, fiber splitter 190A includes passive optical components that split optical signals on uplink fiber 38A into separate duplicate optical signals on optical fibers 184B and 186B.

Uplink signals on optical fibers 184B and 186B are duplicate portions of the same common optical uplink signal received on uplink fiber 38A. Uplink signals on fiber 184B may connect via port 142B and uplink fiber 52B to active communication equipment in BBU 48 while the same uplink signals on fiber 186B may connect via monitoring port 144B to monitoring/test equipment (not shown).

An operator may use the monitoring/test equipment connected to monitoring ports 144 to perform testing operations, such as power measurements, out of band optical time domain reflectometry, or radio frequency (RF) over common protocol radio interface measurements. Since a separate uplink signal is connected via fiber 186B to monitoring port 144B, the test equipment may perform tests without interrupting signal transmissions between RRU 18 and BBU 48.

Power levels for uplink signals on optic fibers 184B and 186B may depend on the specific specifications for optical fiber splitter 190A. A splitting ratio and number of output ports on fiber splitter 190A can vary from 1% to 99% of the input signal power on uplink fiber 38A. For example, fiber splitter 190A may split the power of uplink signals on fibers 184B and 186B each by 50% of the signal power on uplink fiber 38A.

Efficient signal monitoring may require control on both transmitting (Tx) and receiving (Rx) directions. Therefore, second fiber splitter 190B splits downlink signals transmitted from BBU 48 to RRU 18 on downlink fiber 52A into two downlink signals on fibers 188B and 186A. The split downlink signal on fiber 188B goes to RRU 18 via port 146B and fiber 38B. The split downlink signal on fiber 186A goes to the monitoring/test equipment via monitoring port 144A. Fiber splitter 190B may divide output power levels similar to fiber splitter 190A.

Other example modular fiber optic cable splitters are described in U.S. patent application Ser. No. 14/931,699, entitled: MODULAR FIBER OPTIC CABLE SPLITTER, filed Nov. 3, 2015, which is herein incorporated by reference in its entirety.

Figure 13:
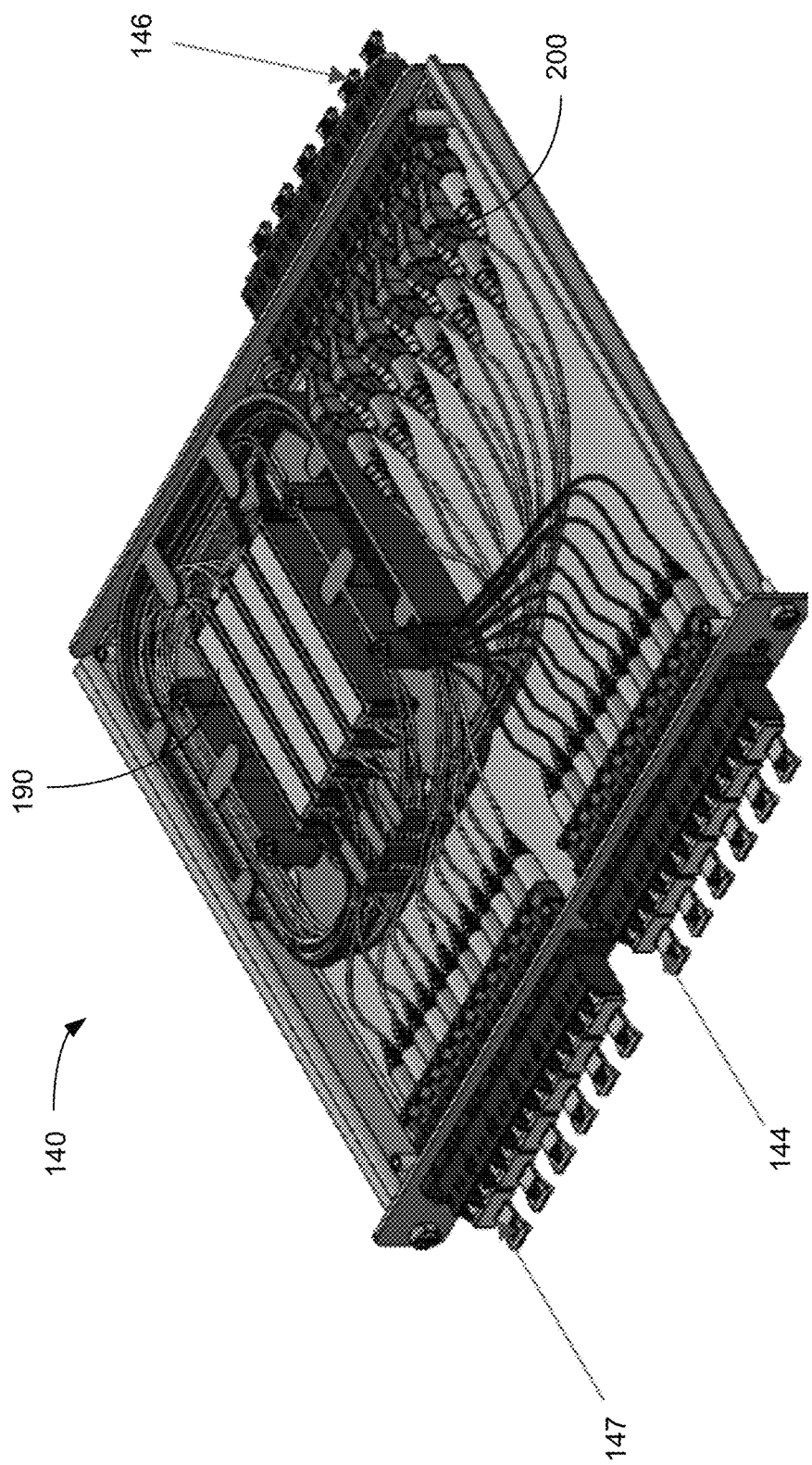
FIG. 13 shows optical fiber reflectors attached in the optical fiber module.
Figure 14:
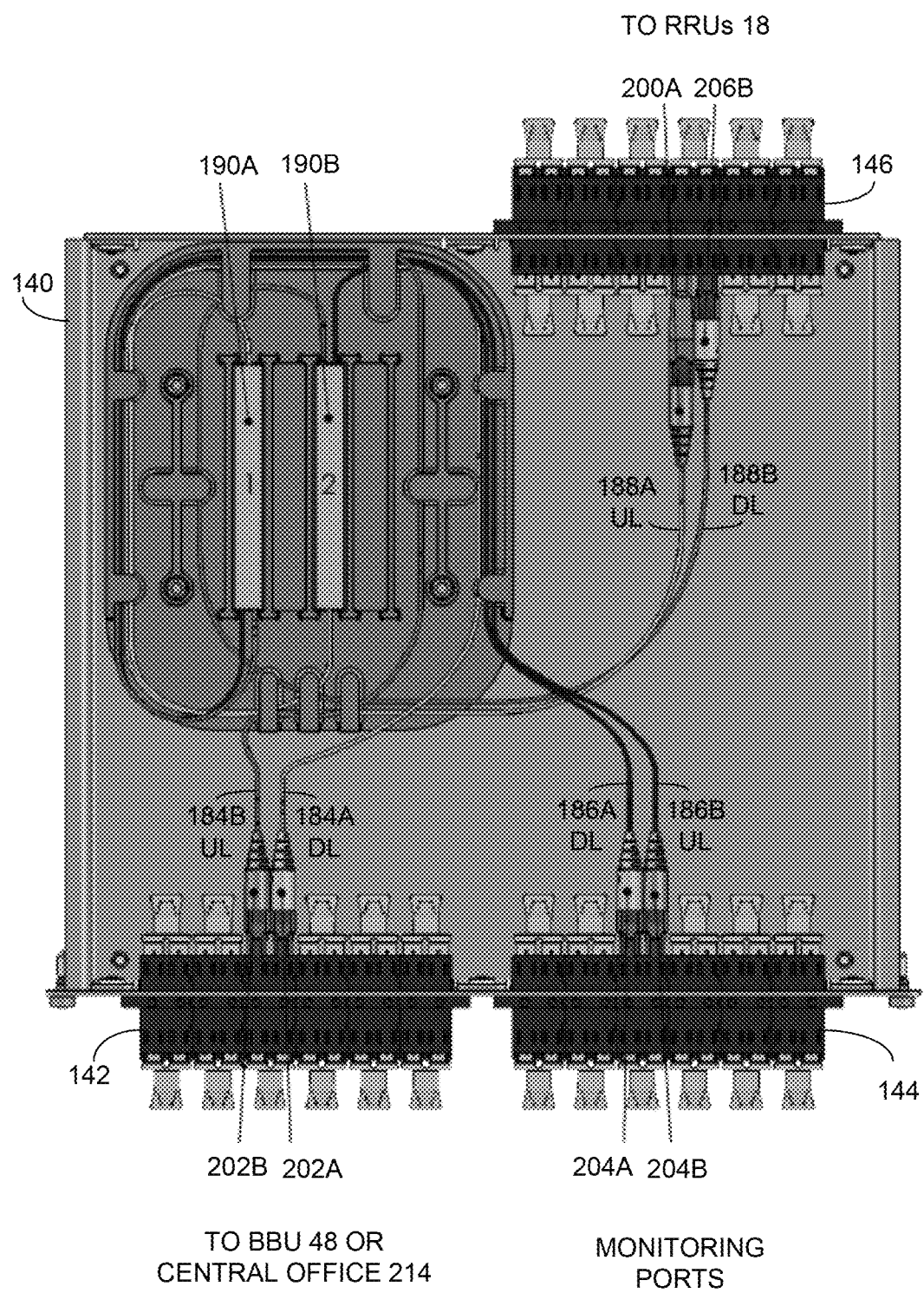
FIG. 14 shows in more detail one example of how an optical fiber reflector is attached in the optical fiber module.

FIG. 13 shows a perspective view of an alternative configuration of fiber module 140 that includes multiple integrated optical signal reflectors 200. FIG. 14 shows a top view of module 140 with one attached reflector 200. Fiber module 140 uses reflectors 200 to enable optical time domain reflectometry (OTDR) measurements. For example, in the case of a centralized topology, reflectors 200 can be used to inspect the optical fibers between a central office and the edge of the fiber network at the base of tower 14 (FIG. 1).

FIG. 13 shows multiple reflectors 200 connected to multiple uplink ports 146A that connect to RRUs 18 in FIG. 12. FIG. 14 shows in more detail one reflector 200A connected to one uplink RRU port 146. Referring to FIGS. 13 and 14, reflector 200A is connected via uplink fiber 188A to the upper end of fiber splitter 190A. A first uplink output from fiber splitter 190A is connected to one of the uplink monitoring ports 144 via uplink fiber 186B and connector 204B. A second uplink output from fiber splitter 190A is connected to one of the uplink BBU or central office ports 142 via uplink fiber 184B and connector 202B.

In this example, no reflector is connected to the associated downlink fiber connections. The associated RRU downlink port 146 is connected to a first output from fiber splitter 190B via downlink fiber 188B and connector 206B. The input of fiber splitter 190B is connected to one of downlink BBU ports 142 via connector 202A and downlink fiber 184A and the second output from fiber splitter 190B is connected to one of downlink monitoring ports 144 via connector 204A and downlink fiber 186A. Other reflectors 200 may connect between other uplink RRU ports 146 and other associated fiber splitters 190 as shown above in FIG. 13.

Figure 15:
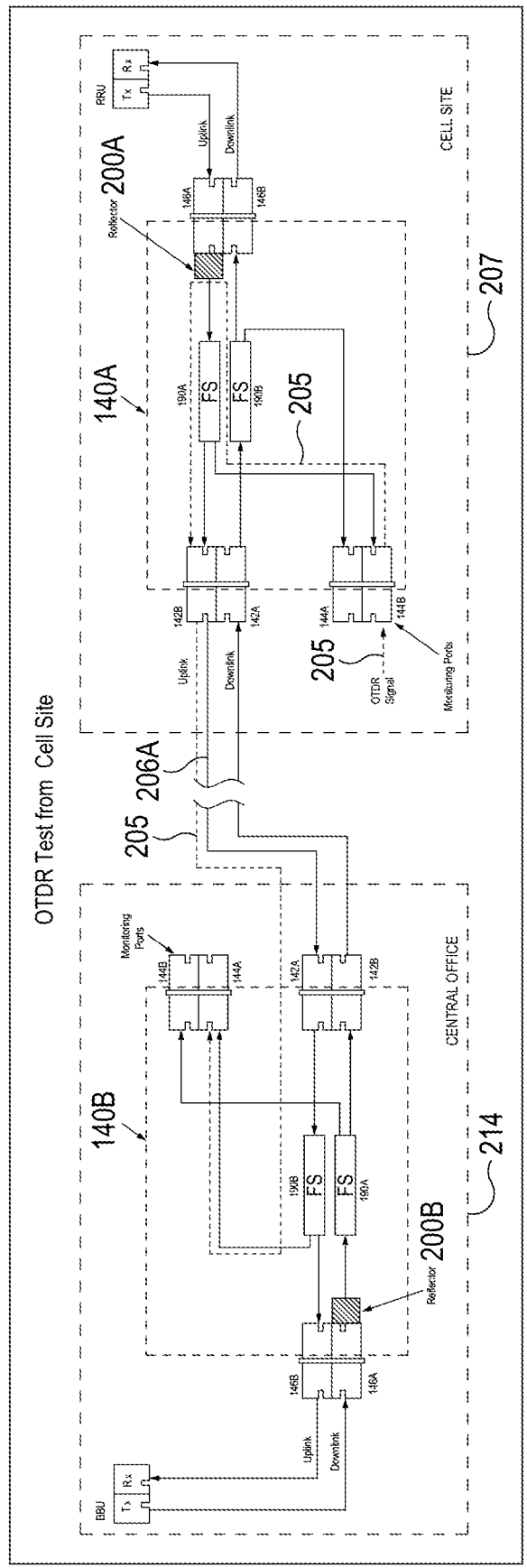
FIG. 15 is a block diagram showing how optical fiber modules are used for reflecting test signals over an uplink fiber from a cell tower site to a central office.

FIG. 15 is a block diagram showing how an uplink optical fiber 206A is tested from a cell site location 207. In one example, reflector 200A is installed on the Tx uplink port 146A as shown above. An OTDR signal 205 is injected into optical module 140A at the cell site location 207 through monitor port 144B. OTDR signal 205 travels through fiber splitter 190A towards RRU uplink port 146A. Reflector 200A reflects OTDR signal 205 back through fiber splitter 190A and out BBU uplink port 142B.

OTDR signal 205 travels over an uplink optical fiber 206A to an optical fiber module 104B located at the central office 214. OTDR signal 205 is received at a RRU uplink port 142A of fiber module 104B and passes through fiber splitter 190B to monitoring port 144A. Redirected OTDR signal 205 enables OTDR inspection at the far end of fiber link 206 between cell site location 207 at the base of the cell tower and central office 214.

Figure 16:
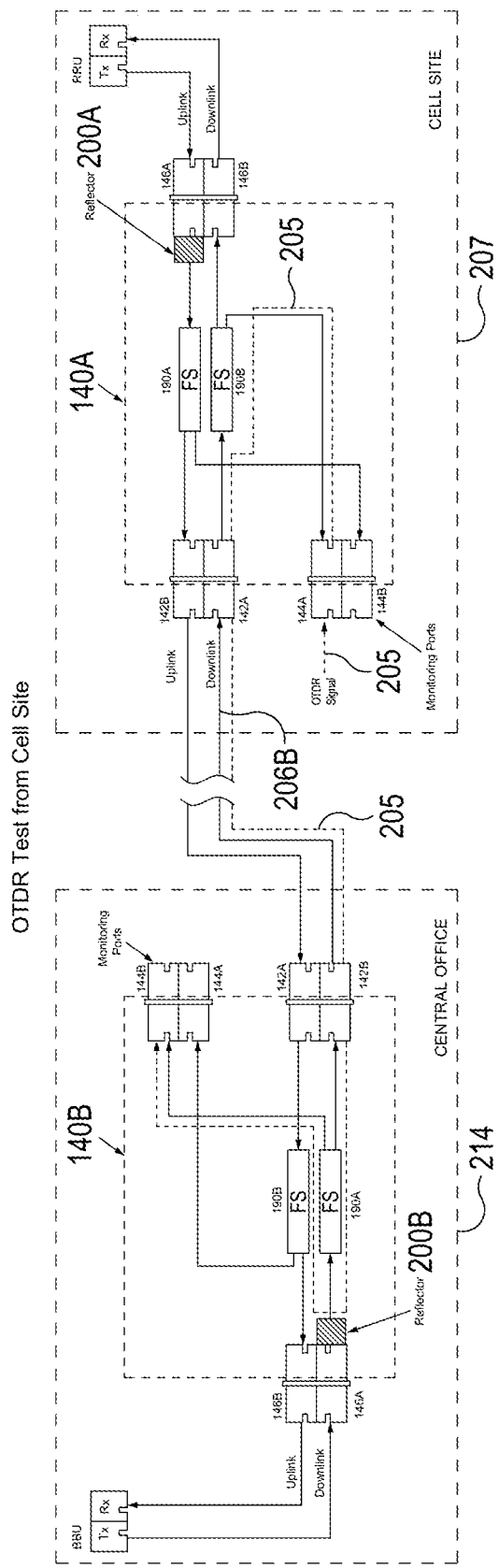
FIG. 16 is a block diagram showing how optical fiber modules are used for reflecting test signals over a downlink fiber from a cell tower site to a central office.

FIG. 16 shows an example of how a downlink optical fiber 206B is tested from cell site location 207. OTDR signal 205 is injected into optical module 140A at a cell site location 207 through downlink monitor port 144A. OTDR signal 205 travels through fiber splitter 190B and out BBU downlink port 142A.

OTDR signal 205 travels over downlink optical fiber 206B to optical fiber module 140B located at a central office 214. OTDR signal 205 is received at a RRU downlink port 142B and passes through a fiber splitter 190A toward a BBU downlink port 146A. A reflector 200B connected to BBU downlink port 146A reflects OTDR signal 205 back out through fiber splitter 190A to downlink monitoring port 144A.

Figure 17:
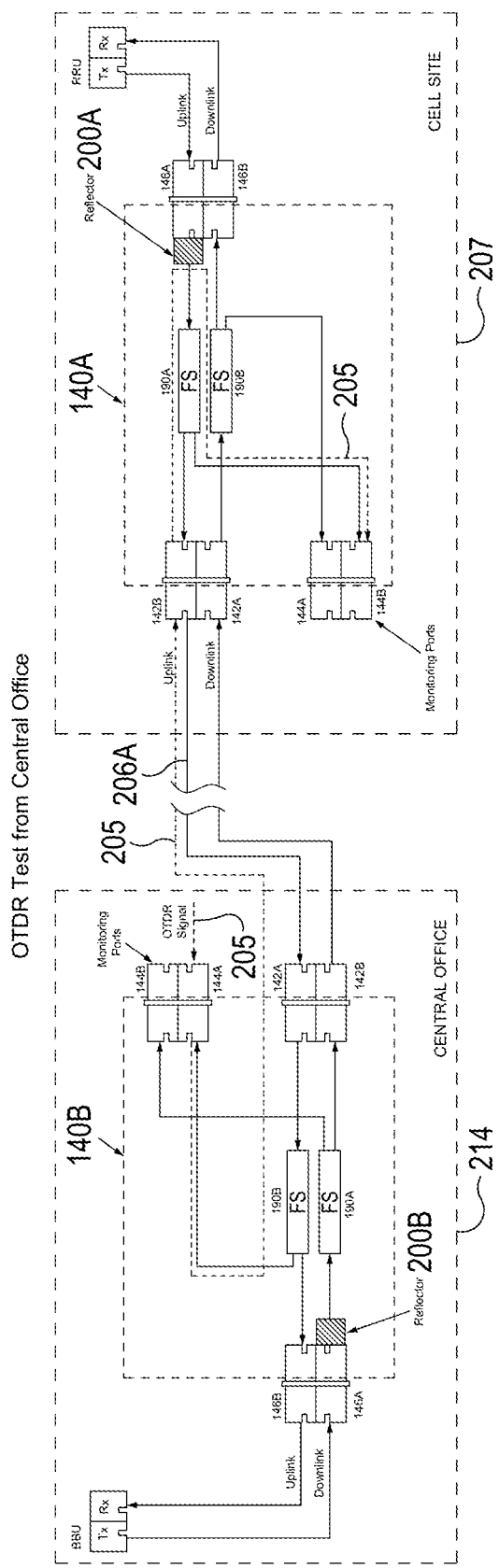
FIG. 17 is a block diagram showing how optical fiber modules are used for reflecting test signals over an uplink fiber from a central office to a cell tower site.

FIG. 17 is a block diagram showing how uplink fiber 206A is tested from central office 214. OTDR signal 205 is injected into optical module 140B at central office 214 through monitor port 144A. OTDR signal 205 travels through fiber splitter 190B and out RRU uplink port 142A. OTDR signal 205 travels over uplink optical fiber 206A and enters fiber module 140A at cell site 207. OTDR signal 205 is received by BBU uplink port 142B and passes through fiber splitter 190A towards RRU uplink port 146A. Reflector 200A on uplink port 146A reflects OTDR signal 205 back through fiber splitter 190A and out uplink monitoring port 144B.

Figure 18:
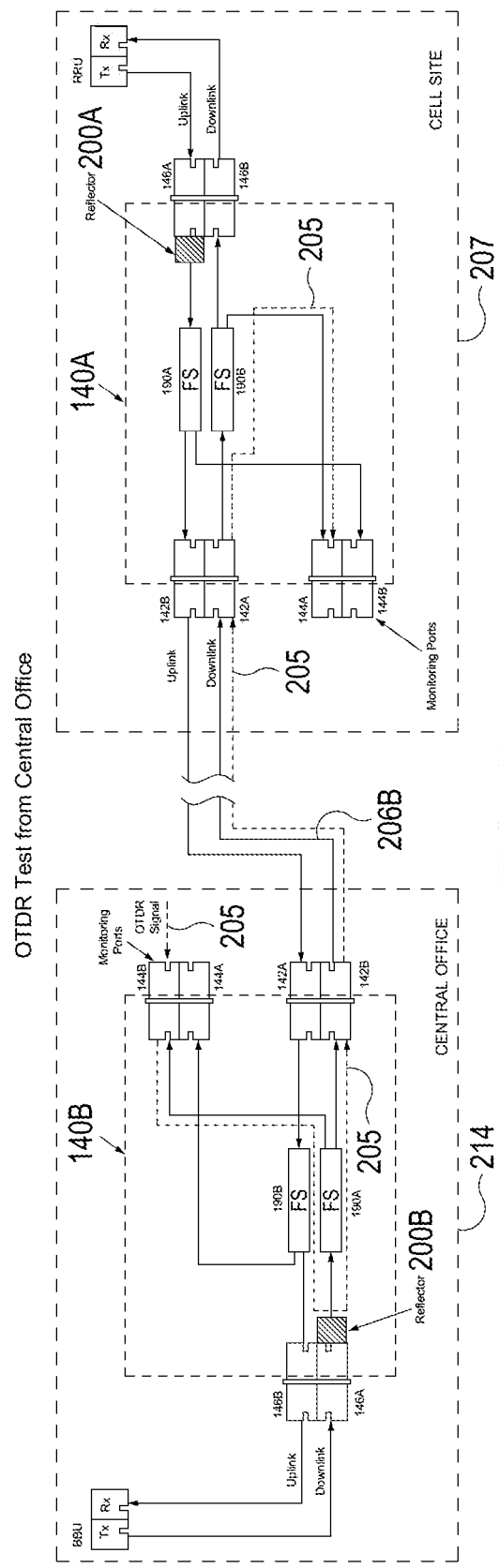
FIG. 18 is a block diagram showing how optical fiber modules are used for reflecting test signals over a downlink fiber from a central office to a cell tower site.

FIG. 18 is a block diagram showing how downlink optical fiber 206B is tested from central office 214. OTDR signal 205 is injected into monitor port 144B of optical module 140B at central office 214. OTDR signal 205 travels through fiber splitter 190A towards BBU downlink port 146A. Reflector 200B is connected to BBU downlink port 145A and reflects OTDR signal 205 back through fiber splitter 190A and out RRU downlink port 142B.

OTDR signal 205 travels over downlink optical fiber 206B to optical module 140A at cell site location 207. OTDR signal 205 enters BBU downlink port 142A and passes through fiber splitter 190B and to downlink monitoring port 144A.

As shown above monitoring ports 144 in optical modules 140A and 140B at the cell tower location 207 and central office 214, respectively, can be used for testing uplink and downlink fibers 206 in both directions. Fiber cables 206 do not need to be unplugged during the testing reducing chances of fiber optic connector contamination.

Integrating reflectors 200 into optical modules 140 allow technicians to identify portions of fiber networks that need inspection. When inspecting healthy optical fibers, reflectors 200 at the ends of optical fibers generate easy to recognize strong reflections. The magnitude of reflected OTDR signals 205 on broken fibers depends on the location of the breakage in relation to reflector 200. If a strong reflection is still visible from the monitoring port, the fiber may be broken after reflector 200, between the base station and the top of the cell tower. If a strong reflection is not visible, the fiber may be broken before reflector 200, between central office 214 and the base of the tower.

Optical Multiplexing/De-Multiplexing Module

Figure 19:
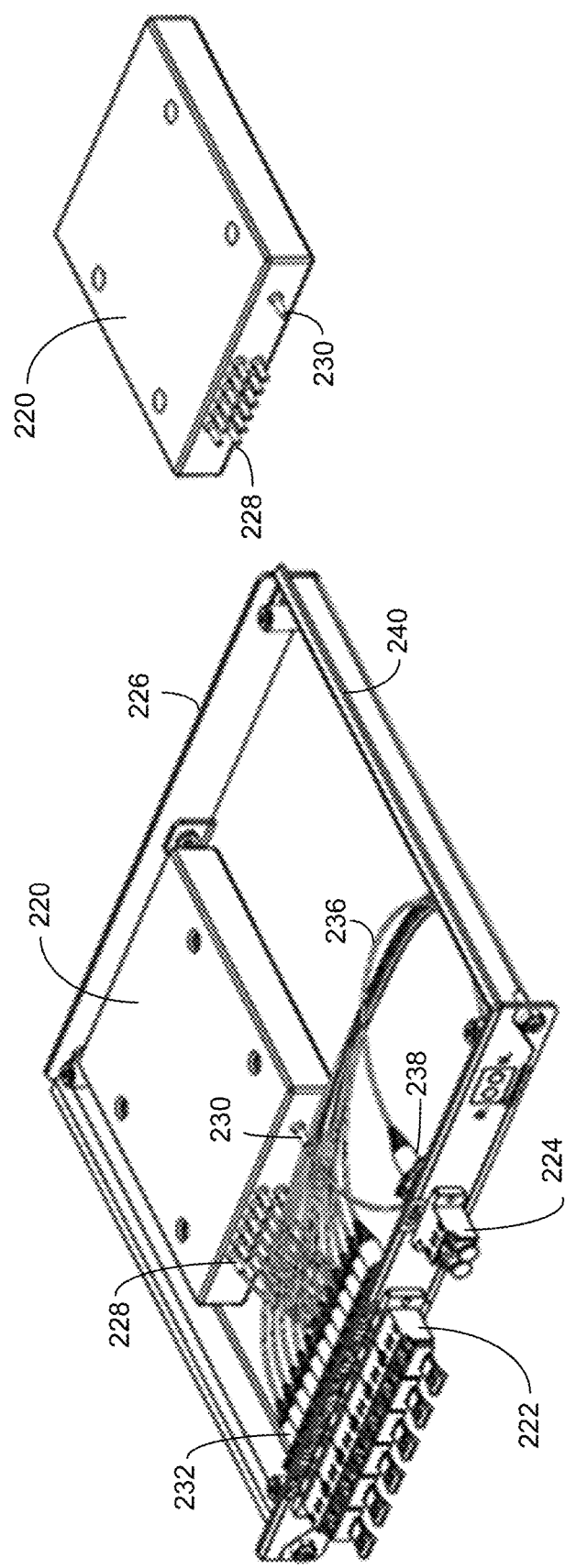
FIG. 19 is a perspective view of an optical multiplexing/de-multiplexing module.
Figure 20:
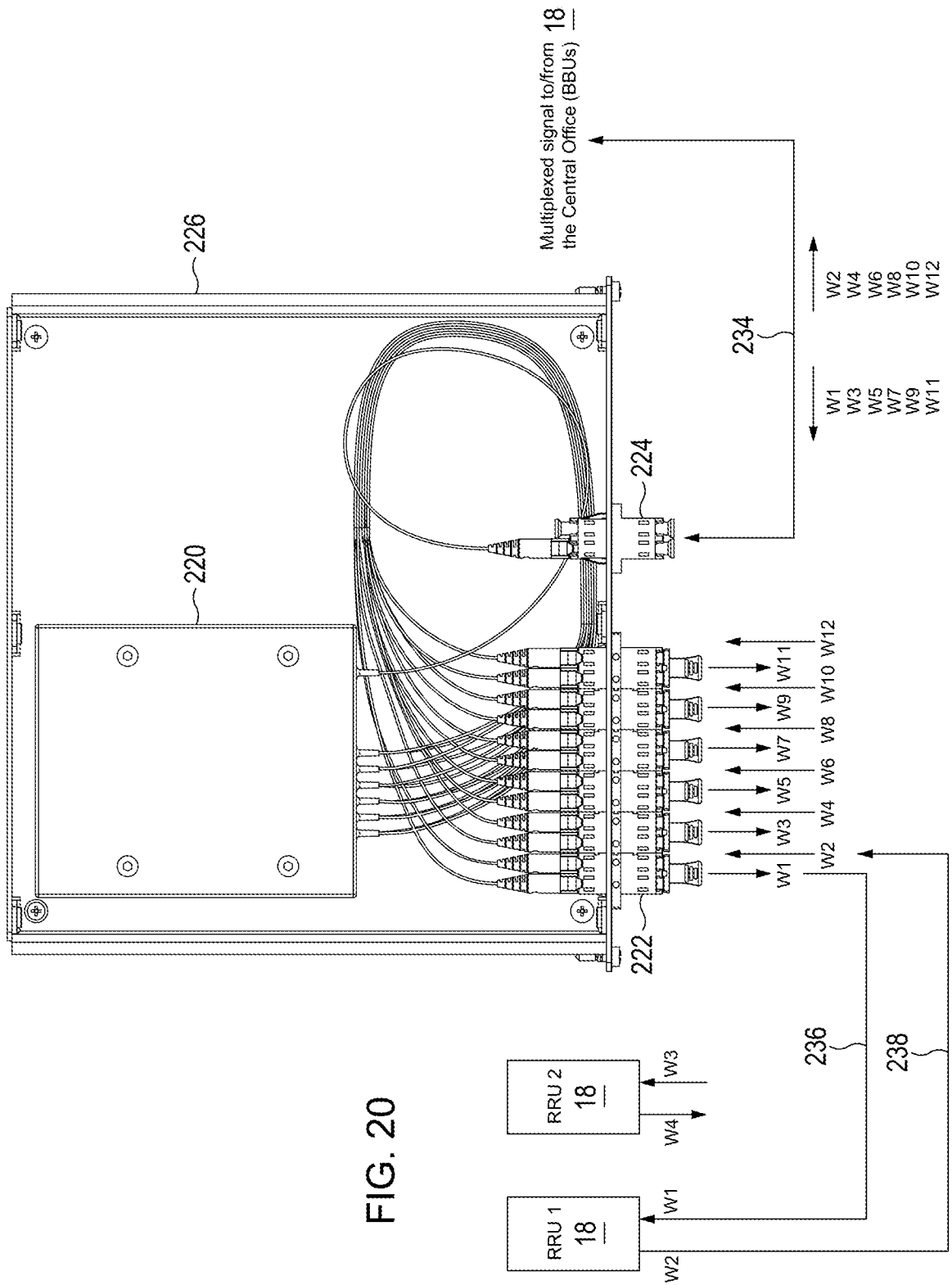
FIG. 20 is a top view of the optical multiplexing/de-multiplexing module shown in FIG. 19.

FIG. 19 is a perspective view and FIG. 20 is a top view of a multiplexer module 226 that may be installed in the fiber management system 100 shown above. Referring to FIGS. 19 and 20, multiplexer module 226 may have substantially the same shape as optical modules 140 described above. Multiplexer module 226 may retain an optical multiplexer/de-multiplexer 220 (multiplexer) that multiplexes and de-multiplexes signals received and sent between different RRUs 18 and BBUs 48.

Multiplexer 220 may accommodate a range of optical components including but not limited to coarse wavelength division multiplexing (CWDM) and dense wavelength division multiplexing (DWDM) modules. Multiplexer 220 can be cascaded with optical fiber modules 140 or can be integrated with optical splitters 190 to provide permanent optical taps.

Multiplexer 220 includes connectors 228 for uplink and downlink fiber optic signals send and received to and from RRUs 18. A connector 230 receives and outputs multiplexed uplink and downlink fiber optic signals. Multiplexer module 226 may include ports 222 that connect to uplink and downlink optical fibers connected to RRUs 18. Connectors 232 connect the signals on ports 222 with connectors 228 on multiplexer 220. Connector 238 connects multiplexed signals received on port 224 connected to the BBU with connector 230 on multiplexer 220.

Multiplexer module 226 is shown with an open top, but may include a top lid with a transparent cover, similar to cover 196 shown in FIG. 2. Multiplexer module 226 also includes rails 240 similar to rails 148 formed on fiber module 140. Rails 240 attach to mating sliders 128 and can slidingly extend out of tray 120 in FIG. 2. Different combinations of multiplexer modules 226 and fiber modules 140 can attach inside of tray 120 and connect to different optical uplink and downlink optical fibers.

Each BBU 18 and RRU 18 may transmit at a different wavelength W. For example, RRUs 18 may transmit at wavelengths W2, W4, W6, W8, W10, W12, etc. and BBUs 18 may transmit at wavelengths W1, W3, W5, W7, W9, W11, etc.

Multiplexer module 226 is located at the cell site location in the vicinity of RRUs 18. Multiplexer 220 multiplexes optical signal wavelengths (W2, W4, W6, W8, W10, W12) transmitted by RRUs 18 over optical fibers 238. The multiplexed signals are transmitted over a single optical fiber in a fiber optic cable 234 to BBUs 18 at the central office.

Optical multiplexer 220 demultiplexes the multiplexed wavelengths coming from BBU 18 (W1, W3, W5, W7, W9, W11). The de-multiplexed signals are then transmitted on optical fibers 236 to RRUs 18. A similar multiplexer/de-multiplexer 220 is installed at BBU 48 at the central office to de-multiplex the signals coming from RRUs 18 and multiplex the signals coming from BBUs 18.

Figure 21B:
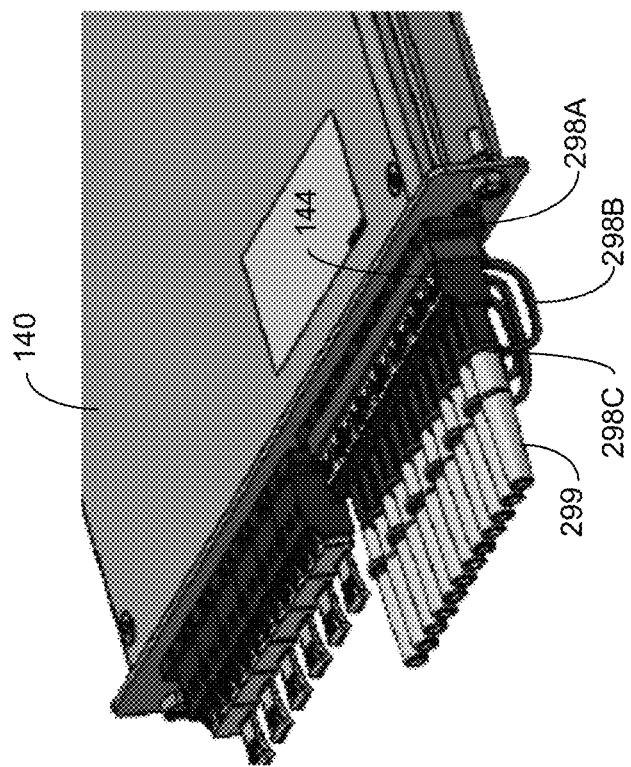
FIGS. 21A and 21B show termination plugs attached to monitoring ports on an optical fiber module.
Figure 21A:
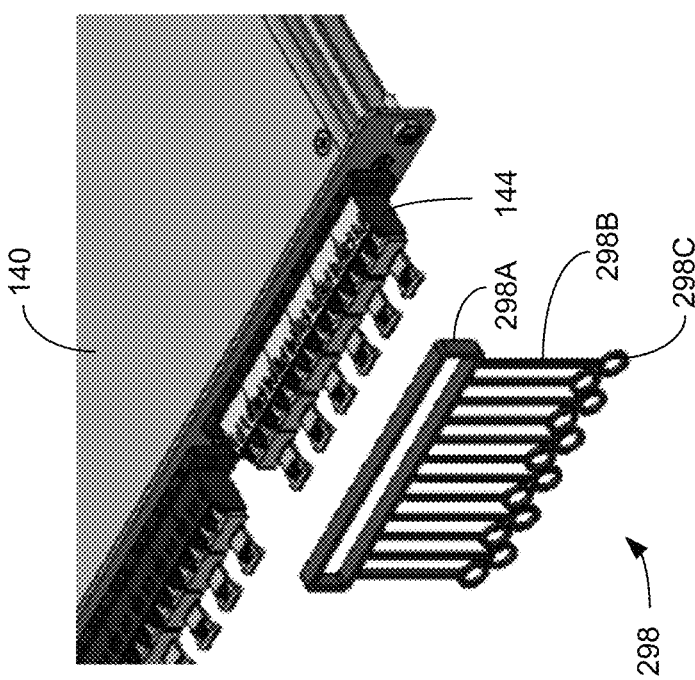

FIGS. 21A and 21B show perspective views of fiber optic terminators used with fiber module 140 or multiplexer module 226. Any references to fiber modules 140 should also be understood to alternatively, or in combination, include multiplexer module 226.

Referring to both FIGS. 21A and 21B, rubber latches 298 may include a rectangular rubber mounting section 298A that seats around monitoring ports 144. Rubber arms 298B may extend down from mounting section 298A and form into rubber rings 298C. Rings 298C may attach around fiber optic terminators 299 which minimize back reflections caused by a fiber/air interface.

Figure 22A:
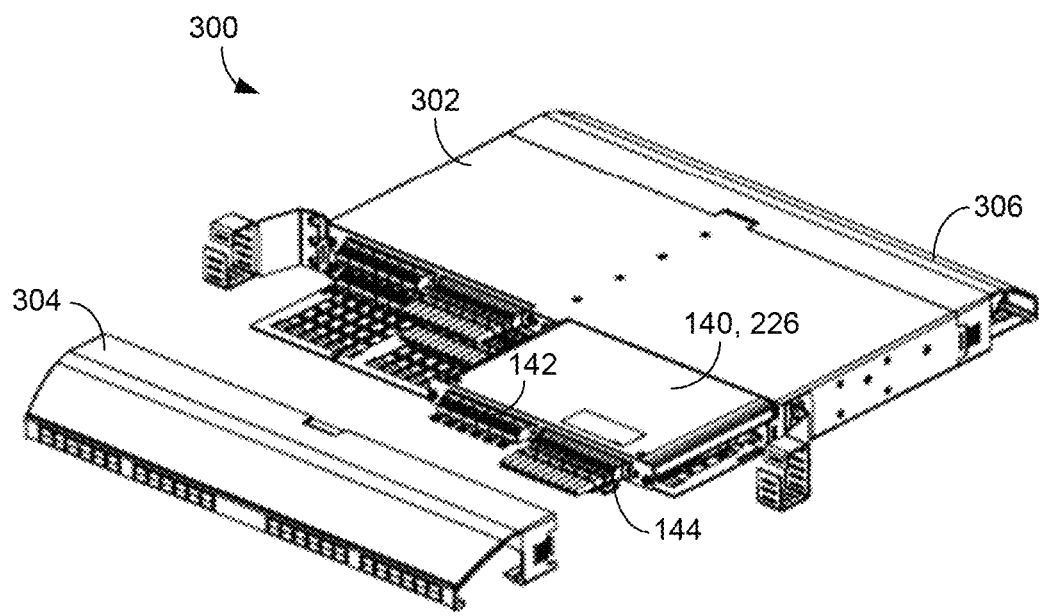
FIGS. 22A and 22B shows a 1 RU enclosure that holds optical fiber modules.
Figure 22B:
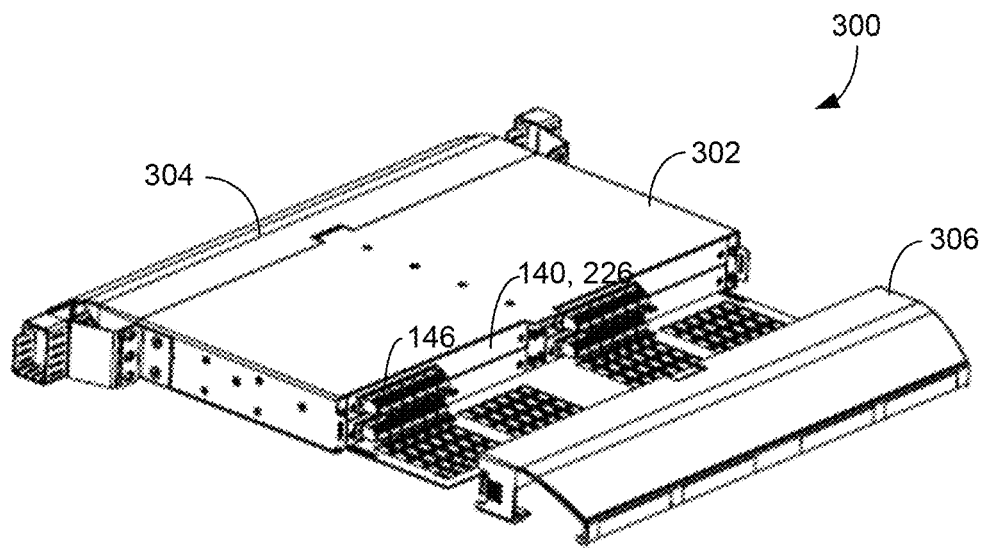

FIG. 22A shows a front perspective view of a high-density fiber optic subrack 300 and FIG. 22B shows a rear perspective view of the high-density fiber optic subrack 300. In this example, subrack 300 may not include a tray that extends out the front of enclosure 302. Alternatively, enclosure 302 may have 1 RU dimensions and slidingly receive four fiber modules 140 or multiplexer modules 226. A front cover 304 may attach to a front end of enclosure 302 and a back cover 306 may attach over a back end of enclosure 302. Covers 304 and 306 may be formed of a transparent material, such as a clear plastic.

Fiber modules 140 or multiplexer modules 226 may insert into slots formed in the front face of enclosure 302 similar to how fiber modules 140 above slide into and out of tray 120. A first column of two fiber modules 140/226 may insert into a left half of enclosure 302 and a second column of two fiber modules 140/226 may insert into a right half of enclosure 302. Two columns of two pairs of BBU ports 142 and monitor ports 144 may extend out of the front end of enclosure 302. Two columns of two RRU ports 146 may extend out of the back end of enclosure 302.

FIG. 23 shows a front perspective view of another high-density fiber optic subrack 320. Subrack 320 also may not include a tray that extends out of enclosure 322. Enclosure 322 may have 4 RU dimensions and retain 16 fiber modules 140 and/or multiplexer modules 226. Again, any reference to fiber modules 140 can also refer to similarly sized multiplexer modules 226. A front cover 324 may attach to a front end of enclosure 322 and a back cover 326 may attach over a back end of enclosure 322. Covers 324 and 326 also may be formed of a transparent material, such as a clear plastic.

Fiber modules 140 or multiplexer modules 226 may insert into slots formed in the front face of enclosure 322 similar to how fiber modules 140 above slid into and out of tray 120. A first column of eight fiber modules 140 and/or 226 may insert into a left half of enclosure 322 and a second column of eight fiber modules 140 and/or 226 may insert into a right half of enclosure 322. Two columns of eight pairs of BBU ports 142 and monitor ports 144 may extend out the front end of enclosure 322. Two columns of eight RRU ports 146 (not shown) may extend out of the back end of enclosure 322.

The fiber cable management systems described incorporate compact designs to provide both cable management, field handling and optical taping functionalities; and include sliding mechanisms and pluggable optical fibers for easier maintenance and component replacement. The modularity uses the same optical fiber modules and/or multiplexer modules 226 to increase installation options, such as in an outdoor cabinet, central office, or shelter. The management system also provides high termination density, and easier access to ports and easier connector/adaptor handling. The system may fit into a 1.0 RU, 1.5 RU, or 4.0 RU subrack height.

Only those parts of the various units are shown and described which are necessary to convey an understanding of the examples to those skilled in the art. Those parts and elements not shown may be conventional and known in the art. Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A fiber optic cable management system for connecting to optical fibers, comprising:
an enclosure having enclosure side walls;
a tray slidingly insertable into the enclosure and slidingly extendable at least partially out from the enclosure, the tray including:
a floor and side walls;
sliders attached to an inside surface of the enclosure side walls; and
mating sliders attached to an outside of the side walls of the tray, wherein the sliders slidingly reciprocate in brackets attached to the inside surface of the enclosure side walls, and the mating sliders slidingly reciprocate within the sliders;
one or more optical fiber modules located inside the tray and including front optical fiber ports extending out front ends of the fiber modules, back optical fiber ports extending out back ends of the fiber modules, and rails located on opposite sides of the optical fiber modules slidingly coupling the optical fiber modules to the side walls of the tray, wherein the optical fiber modules can slide independently of the floor and side walls of the tray when the tray is extended at least partially out of the enclosure moving the back ends of the modules out of the enclosure and locating the back optical fiber ports a spaced distance in front of a front end of the enclosure; and
optical fiber splitters located inside ones of the fiber modules, the optical fiber splitters each connected between a first one of the optical fiber ports configured to connect to a remote radio unit, and a second one of the optical fiber ports configured to connect to a baseband unit (BBU).

2. The fiber optic cable management system of claim 1, further comprising a flexible cable guide configured to retain the optical fibers, the cable guide coupled at a first end to the enclosure and coupled at a second end to the tray.

3. The fiber optic cable management system of claim 2, wherein the cable guide includes a series of rotatably attached chain links that rotate about connectors, allowing the cable guide to at least partially straighten out when the tray is pulled out of the enclosure.

4. The fiber optic cable management system of claim 2, including a spool attached in the tray between the second end of the cable guide and the back ends of the fiber modules and configured to retain excess length of the optical fibers.

5. A fiber optic cable management system for connecting to optical fibers, comprising:
an enclosure;
a tray slidingly insertable into the enclosure and slidingly extendable at least partially out from the enclosure, the tray including:
a floor and side walls;
sliders attached to an inside surface of the enclosure side walls; and
mating sliders attached to an outside of the side walls of the tray, wherein the sliders slidingly reciprocate in brackets attached to the inside surface of the enclosure side walls, and the mating sliders slidingly reciprocate within the sliders;
one or more optical fiber modules located inside the tray and including front optical fiber ports extending out front ends of the fiber modules, and back optical fiber ports extending out back ends of the fiber modules, the tray when extended at least partially out of the enclosure moving the back ends of the modules out of the enclosure exposing the back optical fiber ports;
optical fiber splitters located inside ones of the fiber modules, the optical fiber splitters each connected between a first one of the optical fiber ports configured to connect to a remote radio unit, and a second one of the optical fiber ports configured to connect to a baseband unit (BBU); and a flexible cable guide configured to retain the optical fibers, the cable guide coupled at a first end to the enclosure and coupled at a second end to the tray, wherein the cable guide is configured to curl into a substantially u-shape when the tray is inserted into the enclosure and at least partially straighten out when the tray is pulled out of the enclosure.

6. The fiber optic cable management system of claim 1, further comprising:
a first set of rails located on the side walls of the tray;
a second set of rails located on opposite sides of the modules; and
a set of sliders reciprocating within the first and second set of rails allowing the modules to slide in and out of the enclosure independently of the tray.

7. The fiber optic cable management system of claim 1, wherein the fiber modules slidingly extend out from the front end of the tray.

8. The fiber optic cable management system of claim 1, wherein the optical fiber splitters are further connected to a monitoring device.

9. The fiber optic cable management system of claim 1, including a fiber optic signal reflector coupled to a first one of the optical fiber ports for reflecting a test signal received at a second one of the ports to a third one of the ports.

10. The fiber optic cable management system of claim 1, including at least one optical multiplexer/de-multiplexer module located inside of the tray and including multiple un-multiplexed optical fiber ports for connecting to remote radio units (RRUs) and a multiplexed optical fiber port for connecting to the base band unit (BBU).

11. The fiber optic cable management system of claim 1 including pass through adaptors connected to a front end of the enclosure to connect to the optical fibers connected to remote radio units (RRUs) to the optical fibers connected to base band unit (BBU) while bypassing the optical fiber modules.

12. A fiber optic cable management system for connecting to optical fibers, comprising:
an enclosure having enclosure side walls;
a tray slidingly insertable into the enclosure and slidingly extendable at least partially out from the enclosure, the tray including:
a floor and side walls;
sliders attached to an inside surface of the enclosure side walls; and
mating sliders attached to an outside of the side walls of the tray, wherein the sliders slidingly reciprocate in brackets attached to the inside surface of the enclosure side walls, and the mating sliders slidingly reciprocate within the sliders;
one or more optical fiber modules located inside the tray and including front optical fiber ports extending out front ends of the fiber modules and back optical fiber ports extending out back ends of the fiber modules;
optical fiber splitters located inside ones of the fiber modules, the optical fiber splitters each connected between a first one of the optical fiber ports configured to connect to a remote radio head, and a second one of the optical fiber ports configured to connect to a base-band unit (BBU); and
a flexible cable guide coupled at a first end to the enclosure and coupled at a second end to the tray.

13. The fiber optic cable management system of claim 12 wherein the cable guide includes a platform and sides extending up along sides of the platform configured to retain the optical fibers, wherein the cable guide is configured to partially curl when the tray is inserted into the enclosure and at least partially straighten out when the tray is pulled out of the enclosure.

14. The fiber optic cable management system of claim 12, wherein the cable guide includes a series of rotatably attached chain links each including a separate platform and a hoop extending across opposite sides of the platform.

15. The fiber optic cable management system of claim 12, including a spool attached in the tray between the second end of the cable guide and the back ends of the fiber modules and configured to retain excess length of the optical fibers.

16. The fiber optic cable management system of claim 12, wherein the cable guide is configured to curl into a substantially u-shape when the tray is inserted into the enclosure.

17. The fiber optic cable management system of claim 12, wherein the fiber modules slidingly extend out from the front end of the tray.

18. The fiber optic cable management system of claim 12, wherein the optical fiber splitters are further connected to connect to a monitoring device.

19. The fiber optic cable management system of claim 12, including a fiber optic signal reflector coupled to a first one of the optical fiber ports for reflecting a test signal received at a second one of the ports to a third one of the ports.

* * * * *